US011973758B2

United States Patent
Baryshnikov et al.

(10) Patent No.: US 11,973,758 B2
(45) Date of Patent: *Apr. 30, 2024

(54) SELF-SERVE APPLIANCES FOR CLOUD SERVICES PLATFORM

(71) Applicant: Microsoft Technology Licensing, LLC, Redmond, WA (US)

(72) Inventors: Boris V. Baryshnikov, Redmond, WA (US); Mark E. Russinovich, Hunts Point, WA (US); Charles W. Lamanna, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,030

(22) Filed: Jun. 29, 2017

(65) Prior Publication Data
US 2018/0075009 A1 Mar. 15, 2018

Related U.S. Application Data

(60) Provisional application No. 62/394,620, filed on Sep. 14, 2016.

(51) Int. Cl.
*H04L 9/40* (2022.01)
*G06F 9/455* (2018.01)
(Continued)

(52) U.S. Cl.
CPC .......... *H04L 63/10* (2013.01); *G06F 9/45558* (2013.01); *G06F 9/50* (2013.01);
(Continued)

(58) Field of Classification Search
CPC ..... H04L 67/10; H04L 67/1097; H04L 47/70; H04L 63/10; H04L 41/18; H04L 43/04;
(Continued)

(56) References Cited

U.S. PATENT DOCUMENTS 7,308,498 B1 * 12/2007 Olsen .................... H04L 67/563
709/224
7,596,620 B1 * 9/2009 Colton ................ H04L 41/5054
709/201
(Continued)

FOREIGN PATENT DOCUMENTS

WO 2013036920 A1 3/2013

OTHER PUBLICATIONS

Microsoft, "Azure Quickstart Templates", Apr. 2020, https://azure.microsoft.com/en-us/resources/templates/.*
(Continued)

*Primary Examiner* — Ramy M Osman
(74) *Attorney, Agent, or Firm* — Weaver IP P.L.L.C.

(57) ABSTRACT

Methods, systems, apparatuses, and computer program products are described herein that enable a vendor to publish a template to a network-accessible marketplace and that enable a customer to selectively utilize the templates to deploy an appliance to a customer account associated with the customer within a cloud services platform. In an embodiment, deploying the appliance to the customer account comprises deploying resources specified by the template as part of an appliance resource group within the customer account, the specified resources including an appliance management resource that is configured to expose control features of the appliance to the customer. In further accordance with the techniques described herein, access to the appliance resource group is provided to the vendor via a vendor account associated with the vendor within the cloud services platform.

20 Claims, 8 Drawing Sheets

(51) Int. Cl.
    *G06F 9/50* (2006.01)
    *G06F 40/186* (2020.01)
    *H04L 41/084* (2022.01)
    *H04L 41/18* (2022.01)
    *H04L 41/5041* (2022.01)
    *H04L 43/04* (2022.01)
    *H04L 47/70* (2022.01)
    *H04L 67/10* (2022.01)
    *H04L 67/1097* (2022.01)

(52) U.S. Cl.
    CPC .......... *G06F 9/5072* (2013.01); *G06F 40/186* (2020.01); *H04L 41/084* (2013.01); *H04L 41/18* (2013.01); *H04L 41/5045* (2013.01); *H04L 43/04* (2013.01); *H04L 47/70* (2013.01); *H04L 63/08* (2013.01); *H04L 67/10* (2013.01); *H04L 67/1097* (2013.01)

(58) Field of Classification Search
    CPC . H04L 63/08; G06F 9/45558; G06F 9/45537; G06F 9/50; G06F 9/5072; G06F 40/186; G06Q 30/0641
    See application file for complete search history.

(56) References Cited

U.S. PATENT DOCUMENTS

| | | | |
|---|---|---|---|
| 8,176,094 B2 | 5/2012 | Friedman | |
| 8,495,197 B1* | 7/2013 | Nagargadde | H04L 41/00 709/219 |
| 8,683,103 B2* | 3/2014 | Ripberger | G06F 3/0631 710/36 |
| 8,930,541 B2* | 1/2015 | Assuncao | G06F 9/50 709/226 |
| 8,931,041 B1* | 1/2015 | Banerjee | H04L 63/102 726/1 |
| 8,954,564 B2 | 2/2015 | Ferris et al. | |
| 8,977,741 B1* | 3/2015 | Fredinburg | H04L 63/102 709/224 |
| 9,075,788 B1* | 7/2015 | Roth | H07L 67/51 |
| 9,077,728 B1* | 7/2015 | Hart | H04L 63/104 |
| 9,094,292 B2* | 7/2015 | Tung | H04L 67/1097 |
| 9,112,841 B1* | 8/2015 | Brandwine | H04L 41/5051 |
| 9,130,979 B2 | 9/2015 | Anderson et al. | |
| 9,172,621 B1* | 10/2015 | Dippenaar | H04L 41/0879 |
| 9,195,482 B2 | 11/2015 | Ammons et al. | |
| 9,288,214 B2 | 3/2016 | Chang et al. | |
| 9,418,213 B1* | 8/2016 | Roth | H04L 63/105 |
| 9,531,607 B1* | 12/2016 | Pai | H04L 41/5051 |
| 9,535,735 B2* | 1/2017 | Hiebert | G06F 9/45558 |
| 9,614,737 B1* | 4/2017 | Brandwine | H04L 63/08 |
| 9,690,925 B1* | 6/2017 | Banerjee | G06F 21/44 |
| 9,985,905 B2* | 5/2018 | Kampas | G06F 9/50 |
| 10,055,607 B2* | 8/2018 | Sathyadevan | G06F 21/554 |
| 10,104,163 B1* | 10/2018 | Stickle | H04L 63/102 |
| 10,129,172 B1* | 11/2018 | Stafford | G06F 9/4881 |
| 10,318,265 B1* | 6/2019 | To | H04L 67/34 |
| 10,516,667 B1* | 12/2019 | Roth | H04L 63/08 |
| 10,581,757 B2* | 3/2020 | Kostov | G06F 9/45558 |
| 10,587,464 B2* | 3/2020 | Coronado | H04L 63/10 |
| 10,834,135 B1* | 11/2020 | Chhabra | H04L 63/20 |
| 10,949,406 B1 | 3/2021 | Calvo et al. | |
| 11,075,917 B2* | 7/2021 | Dani | H04L 63/20 |
| 11,102,328 B2* | 8/2021 | Kulkarni | H04L 67/025 |
| 2002/0124053 A1* | 9/2002 | Adams | H04L 63/101 709/219 |
| 2003/0093672 A1* | 5/2003 | Cichowlas | G06F 9/468 713/168 |
| 2004/0064480 A1* | 4/2004 | Bartlett | G06Q 30/02 |
| 2004/0088563 A1* | 5/2004 | Hogan | G06F 21/629 726/27 |
| 2004/0098731 A1* | 5/2004 | Demsey | G06F 9/45537 719/328 |
| 2008/0127200 A1* | 5/2008 | Richards | G06F 9/522 718/106 |
| 2009/0182565 A1* | 7/2009 | Erickson | G06Q 10/06 705/300 |
| 2009/0222907 A1* | 9/2009 | Guichard | H04L 63/1408 726/17 |
| 2011/0191485 A1* | 8/2011 | Umbehocker | H04L 63/0428 709/229 |
| 2011/0276490 A1* | 11/2011 | Wang | H04L 63/102 705/50 |
| 2012/0066755 A1* | 3/2012 | Peddada | H04L 63/102 726/8 |
| 2012/0072597 A1* | 3/2012 | Teather | G06F 9/5072 709/226 |
| 2012/0084847 A1* | 4/2012 | Balasubramanian | H04L 63/08 726/7 |
| 2012/0096521 A1* | 4/2012 | Peddada | H04L 41/28 726/4 |
| 2012/0109774 A1 | 5/2012 | Chernenko et al. | |
| 2012/0147894 A1* | 6/2012 | Mulligan | G06F 9/45533 370/395.53 |
| 2012/0150912 A1* | 6/2012 | Ripberger | G06F 21/80 707/786 |
| 2012/0278426 A1* | 11/2012 | Nakagawa | G06F 3/067 709/217 |
| 2012/0297016 A1* | 11/2012 | Iyer | G06F 9/5072 709/217 |
| 2012/0304189 A1* | 11/2012 | Tominaga | G06F 3/0637 718/104 |
| 2013/0007845 A1* | 1/2013 | Chang | G06F 21/62 726/4 |
| 2013/0018994 A1* | 1/2013 | Flavel | H04L 41/0806 709/220 |
| 2013/0031224 A1* | 1/2013 | Nachtrab | H04L 67/51 709/220 |
| 2013/0097601 A1* | 4/2013 | Podvratnik | G06F 9/45558 718/1 |
| 2013/0110675 A1 | 5/2013 | Bouw | |
| 2013/0125209 A1 | 5/2013 | Schumacher | |
| 2013/0173499 A1 | 7/2013 | Cannon | |
| 2013/0185112 A1* | 7/2013 | Friedlander | G06Q 10/0631 705/7.22 |
| 2013/0212129 A1* | 8/2013 | Lawson | H04L 67/10 707/779 |
| 2013/0232252 A1* | 9/2013 | Huang | G06F 9/45558 709/224 |
| 2013/0263209 A1* | 10/2013 | Panuganty | H04L 43/04 726/1 |
| 2013/0290952 A1* | 10/2013 | Childers, Jr. | G06F 9/5072 718/1 |
| 2013/0304693 A1 | 11/2013 | Jaeger et al. | |
| 2013/0311597 A1* | 11/2013 | Arrouye | G06F 9/5072 709/217 |
| 2014/0006094 A1* | 1/2014 | Doran | G06Q 10/10 705/7.28 |
| 2014/0007079 A1* | 1/2014 | Whitney | H04L 67/10 717/176 |
| 2014/0068053 A1 | 3/2014 | Ravi et al. | |
| 2014/0201752 A1* | 7/2014 | Agrawal | G06F 9/5011 718/104 |
| 2014/0278623 A1* | 9/2014 | Martinez | H04L 67/10 705/7.12 |
| 2014/0282821 A1* | 9/2014 | Adler | H04L 63/10 726/1 |
| 2014/0282944 A1* | 9/2014 | Li | H04L 41/18 726/6 |
| 2014/0289412 A1* | 9/2014 | Doddavula | H04L 67/1097 709/226 |
| 2014/0351402 A1 | 11/2014 | Madani et al. | |
| 2014/0358710 A1* | 12/2014 | Balestrieri | G06Q 30/0601 705/26.1 |
| 2014/0359127 A1 | 12/2014 | Linares et al. | |
| 2015/0012977 A1* | 1/2015 | Huh | G06F 21/31 726/4 |
| 2015/0026346 A1* | 1/2015 | Yoon | H04L 47/70 709/226 |

(56) References Cited

U.S. PATENT DOCUMENTS

| | | | |
|---|---|---|---|
| 2015/0033365 A1 | 1/2015 | Mellor et al. | |
| 2015/0067171 A1* | 3/2015 | Yum | G06F 9/5072 709/226 |
| 2015/0135272 A1* | 5/2015 | Shah | H04L 63/08 726/4 |
| 2015/0188927 A1* | 7/2015 | Santhi | H04L 63/104 726/4 |
| 2015/0304175 A1* | 10/2015 | Maes | H04L 67/10 709/226 |
| 2015/0355925 A1* | 12/2015 | Hiebert | G06F 9/45558 718/1 |
| 2015/0378703 A1* | 12/2015 | Govindaraju | G06F 9/5072 717/174 |
| 2016/0014042 A1* | 1/2016 | Kampas | H04L 47/80 709/226 |
| 2016/0036905 A1* | 2/2016 | Syed | H04L 67/1008 709/226 |
| 2016/0092802 A1* | 3/2016 | Theebaprakasam | G06Q 10/0631 705/7.12 |
| 2016/0094403 A1 | 3/2016 | Somogyi et al. | |
| 2016/0094406 A1* | 3/2016 | Phan | H04L 67/1095 709/223 |
| 2016/0094407 A1* | 3/2016 | Parkinson | H04L 67/1004 703/223 |
| 2016/0094627 A1 | 3/2016 | Subramanyam et al. | |
| 2016/0139949 A1* | 5/2016 | Jagannath | G06F 9/5022 718/1 |
| 2016/0148280 A1* | 5/2016 | Marth | G06Q 30/0269 705/14.42 |
| 2016/0259737 A1* | 9/2016 | Saldanha | H04L 63/0823 |
| 2016/0266900 A1* | 9/2016 | Anzai | G06F 9/3005 |
| 2016/0352753 A1 | 12/2016 | Roth et al. | |
| 2017/0006053 A1* | 1/2017 | Greenberg | H04L 63/145 |
| 2017/0034071 A1* | 2/2017 | Sidde | H04L 67/1025 |
| 2017/0214696 A1 | 7/2017 | Cleaver et al. | |
| 2017/0235559 A1 | 8/2017 | Saenz et al. | |
| 2017/0237679 A1* | 8/2017 | Kumar | H04L 47/70 709/226 |
| 2017/0289060 A1* | 10/2017 | Aftab | H04L 67/1097 |
| 2018/0039641 A1* | 2/2018 | Mondal | G06F 16/29 |
| 2018/0075009 A1* | 3/2018 | Baryshnikov | G06F 17/248 |
| 2021/0342196 A1 | 11/2021 | Natarajan et al. | |

OTHER PUBLICATIONS

Cignoli, Christine, "Cloud computing templates give IT teams control", Apr. 13, 2013, https://searchcloudcomputing.techtarget.com/news/2240181798/Cloud-computing-templates-add-control-for-IT.*

Finn, Aidan, "Delegating Admin Rights in Microsoft Azure", Dec. 21, 2015, https://petri.com/delegating-admin-rights-in-microsoft-azure/ (Year: 2015).*

Janetscheck, Tom, "How to protect Azure resources from accidental deletion", Jun. 27, 2016, https://blog.azureandbeyond.com/2016/06/27/protect-azure-resources/ (Year: 2016).*

TrendMicr, "Best Security Practices for Microsoft Azure: Locking Down Your Environment", Apr. 29, 2015, https://news.trendmicro.com/2015/04/29/best-security-practices-for-microsoft-azure-locking-down-your-environment/ (Year: 2015).* harrchen88, "Lock resources with Azure Resource Manager", Jun. 24, 2016, https://github.com/uglide/azure-content/blob/master/articles/ resource-group-lock-resources.md (Year: 2016).*

Dufranse et al., "IBM System Storage DS8000", Jan. 2013, ibm.com/redbooks (Year: 2013).* d6veteran et al., "azure-resource-provider-sdk", Dec. 2012, https://github.com/Azure/azure-resource-provider-sdk/blob/master/docs/concepts.md (Year: 2012).*

Bowles, et al., "Copying Azure resource groups between different Azure subscriptions or environments", Dec. 2016, https://devblogs.microsoft.com/azuregov/copying-azure-resource-groups-between-different-azure-subscriptions-or-environments/ (Year: 2016).*

Smith, Russell, "Export Azure Resource Group as a JSON Template", Aug. 2016, https://petri.com/export-azure-resource-group-json-template/ (Year: 2016).*

Microsoft Learn, "Azure Custom Resource Providers Overview", Sep. 2022, https://learn.microsoft.com/en-us/azure/azure-resource-manager/custom-providers/overview (Year: 2022).*

Microsoft Learn, "Assign Azure roles using the Azure portal", May 2023, https://learn.microsoft.com/en-us/azure/role-based-access-control/role-assignments-portal (Year: 2023).*

Fitzmacken, Tom, "Azure Resource Manager overview", Retrieved on: Jun. 27, 2016, Available at: <https://azure.microsoft.com/en-in/documentation/articles/resource-group-overview/>, 7 pages.

Cain, Chris, "Controlling Vendor Access for Small Business", In White Paper of SANS Institute, Sep. 25, 2013, pp. 1-21.

"Non Final Office Action Issued in U.S. Appl. No. 16/892,814", Mailed Date: Feb. 14, 2022, 25 Pages.

Alspach, Kyle, "The 2019 Tech Innovator Awards", Retrieved From: https://www.crn.com/slide-shows/data-center/the-2019-tech-innovator-awards/17, Nov. 11, 2019, 3 Pages.

Chapple, Erin, "Introducing Azure Lighthouse", Retrieved From: https://azure.microsoft.com/en-us/blog/introducing-azure-lighthouse/, Jul. 11, 2019, 5 Pages.

Schuster, Gavriella, "Azure Lighthouse wins 2019 CRN Tech Innovator Award", Retrieved From: https://blogs.partner.microsoft.com/mpn/azure-lighthouse-wins-2019-cm-tech-innovator-award/, Nov. 13, 2019, 4 Pages.

White, Julia, "Azure Services Now Run Anywhere with New Hybrid Capabilities: Announcing Azure Arc", Retrieved From: https://azure.microsoft.com/en-us/blog/azure-services-now-run-anywhere-with-new-hybrid-capabilities-announcing-azure-arc/, Nov. 4, 2019, 5 Pages.

"Non Final Office Action Issued in U.S. Appl. No. 16/892,714", Mailed Date: Aug. 25, 2022, 25 Pages.

"Final Office Action Issued in U.S. Appl. No. 16/892,814", Mailed Date: Jan. 19, 2023, 24 Pages.

"Non Final Office Action issued in U.S. Appl. No. 17/818,195", Mailed Date: Jun. 15, 2023, 14 Pages.

Gao, et al., "Manage Azure Resource Groups by Using the Azure Portal", Retrieved From: https://learn.microsoft.com.en-us-azure-resource-manager/management/manage-resource-groups-portal, Mar. 2, 2022, 6 Pages.

Marinescu, Dan C. , "Cloud Resource Management", Retrieved from: https://www.sciencedirect.com/topics/computer-science/cloud-resource-management, 2018, 7 Pages.

* cited by examiner

SELF-SERVE APPLIANCES FOR CLOUD SERVICES PLATFORM

CROSS-REFERENCE TO RELATED APPLICATIONS

This application claims priority to U.S. Provisional Patent Application No. 62/394,620, filed Sep. 14, 2016 and entitled "Cloud Resource Manager Appliances," the entirety of which is incorporated by reference herein.

BACKGROUND

Cloud computing is a type of Internet-based computing that provides shared computer processing resources and data to computers and other devices on demand. It is a model for enabling ubiquitous, on-demand access to a shared pool of configurable computing resources (e.g., computer networks, servers, storage) and applications and services built thereon, which can be rapidly provisioned and released with minimal management effort. Cloud computing and storage solutions provide users and enterprises with various capabilities to store and process their data in third-party data centers that may be located far from the user-ranging in distance from across a city to across the world. Like a utility (e.g., an electrical grid), cloud computing relies on the sharing of resources to achieve coherence and economy of scale.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that enable a vendor to publish a template to a network-accessible marketplace and that enable a customer to selectively utilize the templates to deploy an appliance to a customer account associated with the customer within a cloud services platform. In an embodiment, deploying the appliance to the customer account comprises deploying resources specified by the template as part of an appliance resource group within the customer account, the specified resources including an appliance management resource that is configured to expose control features of the appliance to the customer. In further accordance with the techniques described herein, access to the appliance resource group is provided to the vendor via a vendor account associated with the vendor within the cloud services platform.

Further features and advantages of the invention, as well as the structure and operation of various embodiments of the invention, are described in detail below with respect to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further explain the principles of the embodiments and to enable a person skilled in the relevant art(s) to make and use the embodiments.

Figure 1:
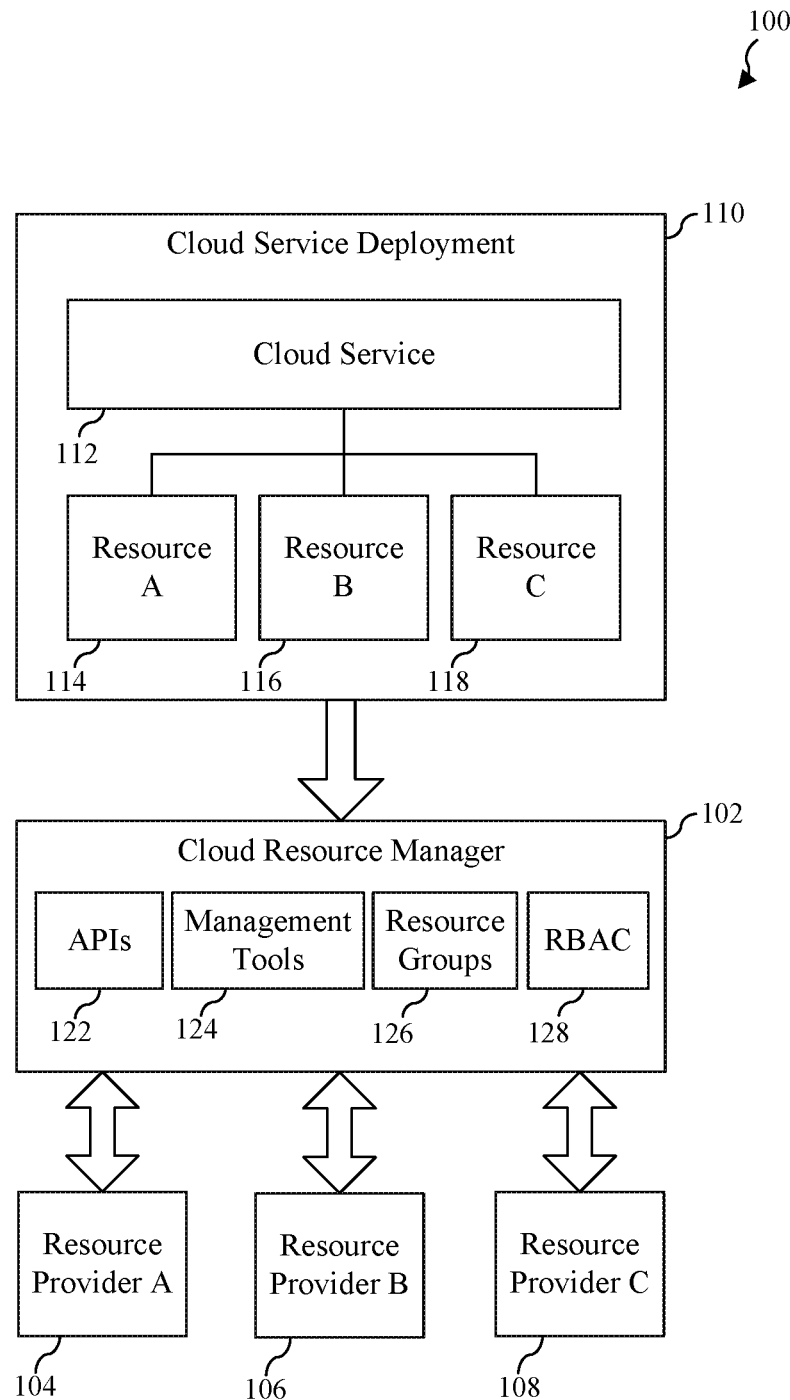
FIG. 1 is a block diagram of an example cloud services platform upon which embodiments may be implemented.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

FIG. 1 is a block diagram of an example cloud services platform 100 upon which embodiments described herein may be implemented. In accordance with at least one embodiment, cloud services platform 100 comprises part of the Microsoft® Azure® cloud computing platform, owned by Microsoft Corporation of Redmond, Wash., although this is only an example and not intended to be limiting. As shown in FIG. 1, cloud services platform 100 includes a cloud resource manager 102, a plurality of resource providers including a resource provider A 104, a resource provider B 106, and a resource provider C 108, and a cloud service deployment 110. Each of these components will now be described.

Cloud resource manager 102 comprises a collection (or "framework") of software-based tools and/or services that can be invoked programmatically or by a user to deploy, update, or delete resources that are themselves utilized to support a cloud service deployment. As used herein the term "cloud service deployment" generally refers to any application or service that is deployed on or otherwise implemented by a cloud infrastructure and includes but is not limited to both Platform as a Service (PaaS) applications and Software as a Service (SaaS) applications. In FIG. 1, cloud resource manager 102 has deployed exemplary cloud service deployment 110. In one embodiment, cloud resource manager 102 comprises the Microsoft® Azure® Resource Manager, although this is only an example and is not intended to be limiting. As used herein, the term "cloud service vendor" or "vendor" is used to broadly refer to any entity that is capable of providing a cloud service (e.g., a PaaS or SaaS application), and may include persons and/or organizations. As used herein, the term "cloud service customer" or "customer" is used to broadly refer to any consumer of a cloud service, and may include persons and/or organizations. A vendor and/or a customer may be the same entity that provides cloud services platform 100, may be employed by or affiliated with such entity, or may be a different entity entirely (e.g., a third party) with respect thereto.

As further shown in FIG. 1, cloud service deployment 110 includes a cloud service 112 that is configured to utilize a plurality of resources including a resource A 114, a resource B 116, and a resource C 118. As used herein, the term "resource" broadly refers to any deployable and/or manageable item that is made available via a cloud services platform such as cloud services platform 100. A resource may comprise, for example and without limitation, a virtual machine, a storage account, a Web application, a database, or a virtual network. Persons skilled in the relevant art(s) will appreciate that a wide variety of other resource types may be made available by cloud services platform 100. Such resources can be used to implement cloud services such as cloud service 112.

In cloud services platform 100, the resources that are used to support a given cloud service deployment are programmatically allocated or provided by a corresponding resource provider. The resource provider may also facilitate monitoring and management of a resource after it is allocated. In the example shown in FIG. 1, cloud resource manager 102 is operable to invoke resource provider A 104 to provide and subsequently manage resource A 114, to invoke resource provider B 106 to provide and subsequently manage resource B 116, and to invoke resource provider C 108 to provide and subsequently manage resource C 118. To facilitate interaction between cloud resource manager 102 and the resource providers, each resource provider is registered with cloud resource manager 102 and establishes a resource provider contract (RPC) therewith (e.g., a Hypertext Transfer Protocol Secure (HTTPS) Representational State Transfer (REST) API contract, although this is only an example). Non-limiting examples of resource providers within the Microsoft® Azure® cloud services platform include Microsoft.Compute, which can provide a virtual machine resource, Microsoft.Storage, which can provide a storage account resource, and Microsoft.Web, which can provide resources related to Web applications.

Cloud resource manager 102 comprises several features that further facilitate the deployment, management and monitoring of resources for cloud service deployments. For example, as shown in FIG. 1, cloud resource manager 102 exposes a set of APIs 122. APIs 122 may be utilized to request and manage resources from a variety of different resource providers (e.g., resource provider A 104, resource provider B 106, and resource provider C 108). In one implementation, such APIs 122 may include REST APIs, although this is only a non-limiting example.

Cloud resource manager 102 also includes management tools 124. Management tools 124 may include a variety of user interfaces (UIs) that an administrator or other user may interact with to deploy, manage and monitor resources via cloud resource manager 102. For example, each of these UIs may be configured to interact with APIs 122 to invoke various features thereof. For example, such UIs may include but are not limited to a Web-based portal (e.g., Microsoft® Azure® Portal), a command line interface (CLI), an interactive command environment with scripting features (e.g., Microsoft® PowerShell®), and a development tool (e.g., Microsoft® Visual Studio®). As will be discussed below with respect to FIG. 2, cloud resource manager 124 also supports the deployment of one or more cloud services and the resources that support them via a template.

Cloud resource manager 102 also includes resource group functionality 126. Resource group functionality 126 is configured to enable resources for a cloud service to be grouped together for the purposes of deployment, management and monitoring. A resource group can be defined to include all the resources allocated to a given cloud service deployment or only a subset of such resources that a user wishes to manage as a group.

Cloud resource manager 102 still further includes role-based access control (RBAC) functionality 128. RBAC functionality 128 may be used to ensure that only persons assigned to certain roles within an organization are able to manage resources or resource groups associated with a given cloud service deployment. Thus, for example, only certain roles may be enabled to interact with cloud resource manager 102 for the purposes of adding, deleting, modifying or configuring certain resources or resource groups associated with a given cloud service deployment.

With respect to the foregoing description of cloud services platform 100, it is to be understood that each of cloud resource manager 102, resource provider A 104, resource provider B 106, and resource provider C 108 may represent software executing on a computer or on one or more interconnected computers. For example, and without limitation, each of these components may be running as software on a collection of networked physical or virtual machines within one or more data centers that comprise cloud services platform 100. Furthermore, with respect to cloud service deployment 110, cloud service 112 may comprise software and resource A 114, resource B 116 and resource C 118 may comprise computing resources used to support the execution of such software (e.g., a virtual machine, a storage account, a Web application, a database, or a virtual network).

Figure 2:
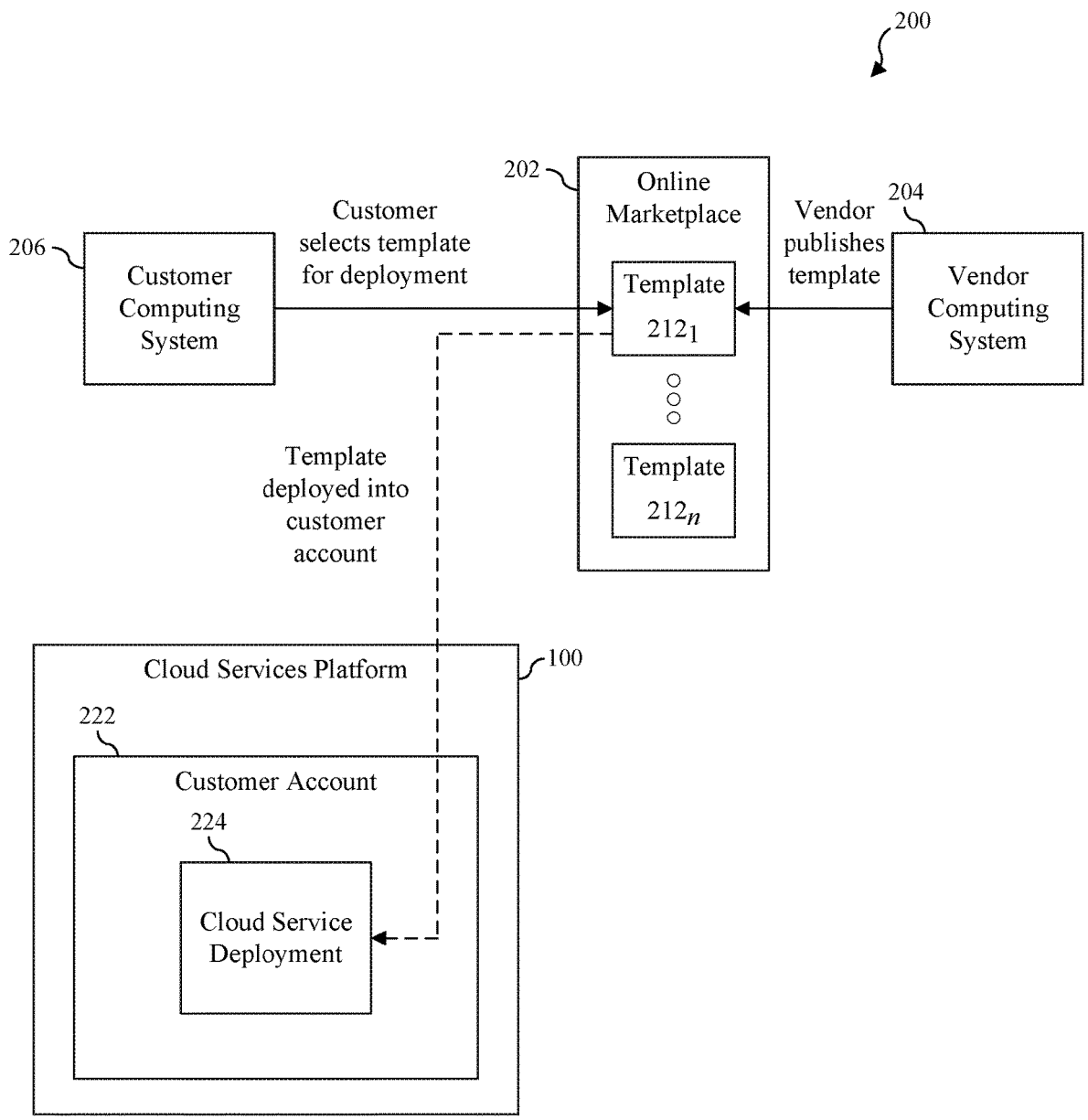
FIG. 2 is a block diagram that illustrates the use of templates to deploy a cloud service within the cloud services platform of FIG. 1.

FIG. 2 is a block diagram that illustrates the use of templates to deploy a cloud service within cloud services platform 100. A template comprises a file (or other suitable container) that includes information that describes how a cloud service should be deployed within cloud services platform 100. For example, the template may specify resources of cloud services platform 100 that must be allocated in support of a given cloud service and how such resources should be configured. The template may further specify how the cloud service should be deployed on top of (i.e., in a manner that utilizes) such resources and how the cloud service should be configured. The template may be text-based, and may further be composed using a declarative syntax rather than imperative commands. In one implementation, the template is composed using a text-based data exchange format such as JavaScript Object Notation (JSON), although this is only an example.

As shown in FIG. 2, a cloud service vendor can utilize its own vendor computing system 204 to publish a template $212_1$ to an online marketplace 202, wherein such template $212_1$ provides information necessary for a customer to deploy the vendor's cloud service to the customer's own account (i.e., to the customer's own set of resources) within cloud services platform 100. Template $212_1$ may be made available along with a variety of other templates $212_2$-$212_n$ for consumption by one or more customers of cloud services. Each template made available in online marketplace 202 may be published by a variety of different cloud service vendors, by a proprietor of cloud services platform 100, or by other entities. Online marketplace 202 may offer hundreds or even thousands of templates. In one implementation, online marketplace 202 comprises the Microsoft® Azure® Marketplace, a Web site published by Microsoft Corporation of Redmond, Wash., although this is only an example.

Template $212_1$ includes information necessary to deploy a vendor's cloud service offering within the customer's account. For example, if the vendor's cloud service is a PaaS or SaaS application, template $212_1$ may declare that a certain number of virtual machines, storage accounts, databases, network connections, and/or the like, each having a specified configuration, must first be allocated within the customer's account by customer services platform 100 before deploying the PaaS/SaaS application. Template $212_1$ may further declare that after such resources have been allocated, that certain specified code comprising the PaaS/SaaS application should be downloaded and installed on one or more of the resources (e.g., one or more virtual machines). Thus, templates may provide for a staged deployment of the cloud service, with certain deployment steps being dependent on the successful execution of certain previous deployment steps.

A template, such as template $212_1$ may also declare that certain information, such as resource deployment settings, cloud service deployment settings, or the like, should be obtained from the customer during the deployment process. Accordingly, a deployment service that is utilized to manage the deployment process may present a UI for obtaining such information from the customer as part of the deployment process. Content of the UI and/or the information to be obtained via the UI may be specified by the vendor via a file (or other suitable container) that may be published along with a template and packaged therewith.

As shown in the example of FIG. 2, a customer using a customer computing system 206 may browse online marketplace 202 via a graphical UI (GUI) thereof and select template $212_1$ for deployment to the customer's account within cloud services platform 100, denoted customer account 222. The customer may then initiate the deployment of template $212_1$ via interaction with the aforementioned GUI.

In response to this initiation step, a marketplace service (which may comprise, for example, part of online marketplace 202) will deploy template $212_1$, thereby causing an instance of the vendor's cloud service and the resources utilized thereby to be deployed within customer account 222. In FIG. 2, this deployment within customer account 222 is denoted cloud service deployment 224. As noted above, the deployment process may be staged in that certain resources may be allocated before other resources, and some or all resources may be allocated before the cloud service itself is installed. Also, as noted above, this deployment process may involve presenting a UI to the customer (e.g., via customer computing system 206) via which the customer can specify certain deployment settings for the resources to be allocated and for the cloud service itself.

Thus, as can be seen from the foregoing description, cloud services deployment system 200 enables vendors of SaaS and PaaS applications to publish templates in an online marketplace (e.g., the Microsoft® Azure® Marketplace), and for customers to deploy such applications into their accounts. This can facilitate the creation of an ecosystem of self-service multi-resource applications. Through the above-described publication of templates, vendors can share best-practice configurations of complex PaaS and SaaS offerings, and customers can provision them in minutes. While the foregoing enables customers to use applications that previously would have required application-specific expertise and time-consuming set up, cloud services deployment system 200 still does not address certain issues and shortcomings associated with the deployment of a vendor's cloud service by a customer.

For example, in the scenario depicted in FIG. 2, after initial provisioning, the customer is typically solely responsible for the ongoing maintenance and update of the application that resides in their accounts. The customer must learn of vendor-created updates out-of-band and manually apply them. If the application fails, the customer must diagnose and fix the problem, or contact the vendor out-of-band and grant the vendor ad-hoc access to their account for troubleshooting.

From the vendor perspective, there is no way to charge customers for the use of an application beyond virtual-machine-image billing, an industry practice in which the cost of the cloud service is tied to the number of virtual machines deployed to implement it. Such practice removes an opportunity for customer-vendor relationship building, and leaves only an antiquated licensing and billing mechanism that is similar to existing on-premises mechanisms, and reduces customer agility. Some PaaS applications may not even utilize virtual machines and typical SaaS application billing models are based on support levels, scale, and abstract usage metrics such as provisioned users and data transactions.

Furthermore, in the scenario depicted in FIG. 2, vendors typically have no way of preventing customers from tampering with application resources once those resources are deployed within the customer account, nor of preventing access to the intellectual property (e.g., the deployment resource requirements and configuration) that makes up the application.

Vendors that want a more controlled and managed experience than that offered by cloud service deployment system 200 must sell their cloud service offering directly and either build a fully multi-tenant service, or deploy single-tenant applications into their own account within cloud services platform 100. The complexity of managing tenancy tracking, resource governance and isolation puts robust multi-tenant applications out of reach of many developers. The vendor is also responsible for tracking and charging customers directly for the underlying resources of cloud services platform 100 that they consume, which also requires them to implement customer billing systems. Vendors are also left to create an application provisioning experience, rather than being able to take advantage of the above-described template-based deployment technique, APIs 122, and management tools 124 (e.g., command-line and Web portal functionality) provided by cloud services platform 100. This model also prevents customers from easily leveraging RBAC functionality 128 to control access to application management endpoints. Finally, customers cannot directly manage the networking configuration of the application's endpoints, for example by connecting the application's virtual network to their own on-premises network.

The following Section will describe a collection of features, provided by a cloud resource manager (e.g., a modified version of cloud resource manager 102 of FIG. 1) that together create an appliance-like experience in a cloud services platform that is aimed at making it easy for vendors to sell fully-managed cloud services (e.g., SaaS and PaaS applications) and for customers to self-service deploy and use them.

Furthermore, the system described in the following Section advantageously enables vendors to bill customers using a billing system provided by the proprietor of the cloud services platform, that uses templates to manage the lifecycle of deployed applications, and that enables customers to automatically acquire updates and pay for support. Such a system may be used to create a cloud-application "app store" ecosystem in the cloud services platform for PaaS and SaaS vendors, corporate central platform teams, as well as system integrators that wish to package and resell their solutions. The described system can holistically support arbitrarily complex applications. With the cloud services platform providing common application lifecycle management and billing services, even small vendors can sell fully-managed SaaS and PaaS applications, and customers can find in such a cloud services platform a marketplace of easy-to-consume applications provided by such vendors that don't come associated with a large infrastructure management tax.

II. Self-Serve Appliance for Cloud Computing Platform

A. Appliance Features

Appliance embodiments described herein are designed to meet the requirements of a range of appliance-like experiences. At one end of the spectrum of experiences is an online marketplace of templates (such as that described in the previous Section) where the customer can self-service deploy an application, but is subsequently responsible for maintenance, and any billing for the use of the appliance must be arranged with a vendor directly or billed in association with the deployed resources. On the other end is an experience desired by SaaS vendors. A small company selling dentist office management software might be an example of a SaaS vendor. They may desire to sell their application as a black-box, have the application's management seamlessly integrate into the API and management systems of the cloud services platform to which the application is deployed, use a billing pipeline associated with the cloud services platform, easily push updates, and allow customers to self-service enable enhanced features and support levels, all while tracking customer usage and sentiment using their application and their own APIs.

In the middle are many PaaS vendors, who want to make available a PaaS service as a self-contained application that customers can deploy themselves. While such vendors may want the application's management interface to integrate deeply with the cloud service platform to which the application is deployed for a unified experience, they wish to allow customer access to the appliance's underlying resources, while still being able to update and optionally charge for the use of the service. This type of appliance allows customers the opportunity to customize the appliance's internal operation, for example by installing their preferred antivirus into the appliance's virtual machines, or by configuring network security groups to the networking of the appliance in accordance with the customer's security policies. This capability is highly desirable for services that will be part of a larger customer application to which such policies and management standards apply.

The appliance model described herein enables many features which are designed to make it easier for vendors to publish applications and for customers to consume them. As will be seen, the features can satisfy the needs of "black box" SaaS appliances and may be a superset of those needed for the more "open-box" PaaS experiences. These features may include one or more of but are not limited to: (i) vendors can self-service publish appliances to an online marketplace; (ii) customers can self-service deploy appliances from the online marketplace; (iii) customers can self-service enable enhanced appliance functionality and support levels; (iv) customer access to an appliance may be via an interface that is integrated with RBAC functionality of a cloud resource manager; (v) vendors can specify feature-specific billing and support billing charges; (vi) vendors have full access to an appliance's resources for diagnostics and troubleshooting that's integrated with the RBAC functionality of the cloud resource manager; (vii) vendors can self-service update deployed appliances; (viii) vendors can query information about the provisioned instances of their appliances, including the customers that have deployed them and the version; (ix) vendors can query usage information, customer information, and detect trends to improve their application; and (x) vendors can solicit customer feedback and ratings on their application to improve and share the score.

The following sub-sections will describe enhancements to the functionality of a cloud resource manager (e.g., cloud resource manager 102 of FIG. 1), an online marketplace (e.g., online marketplace 202 of FIG. 2), and a billing system associated with a cloud services platform (e.g., cloud services platform 100) of FIG. 1 to provide the foregoing features and to accommodate the full spectrum of appliance scenarios.

B. Appliance Model Overview

Figure 3:
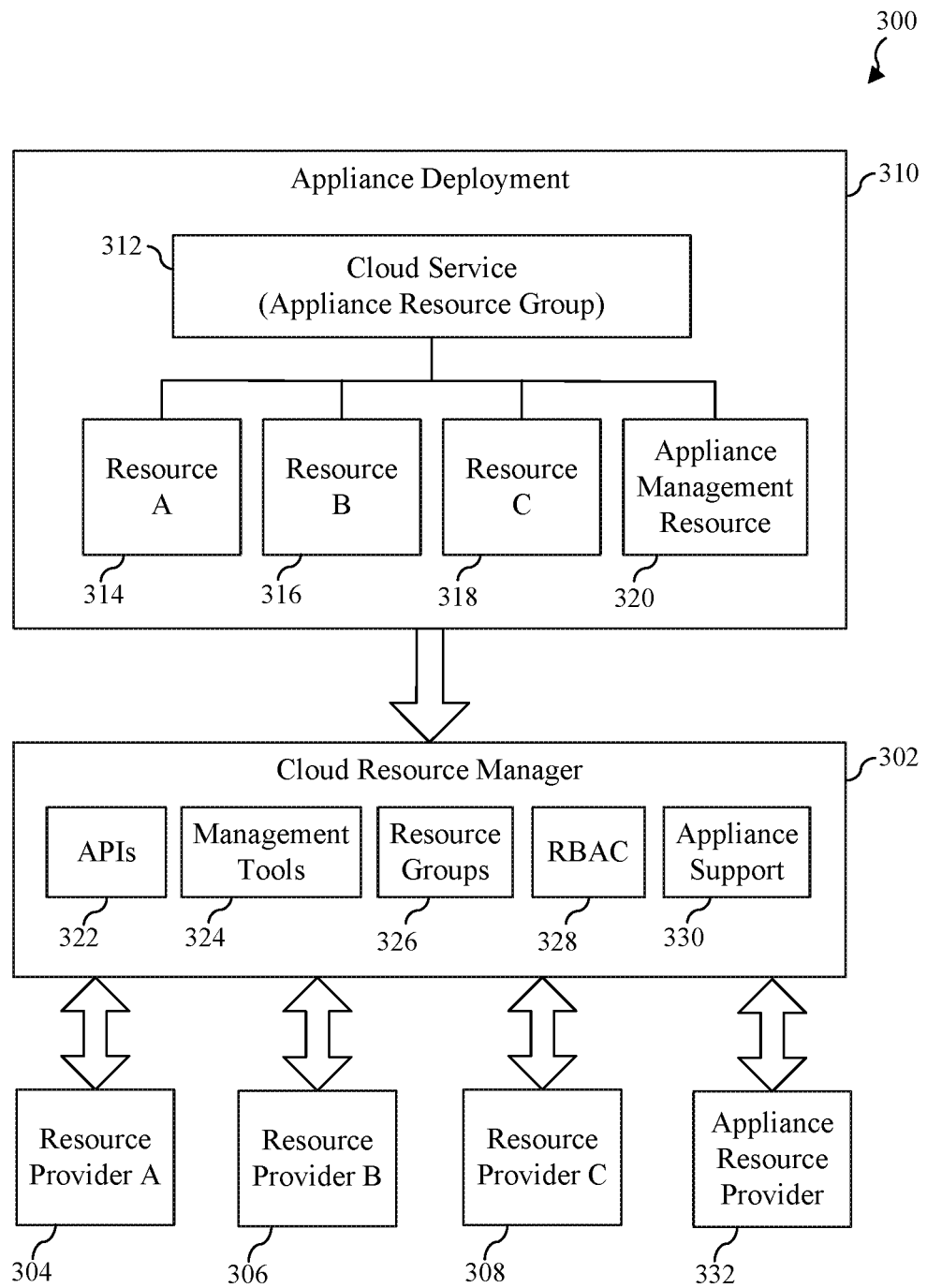
FIG. 3 is a block diagram of an example cloud services platform that is configured to support the self-service deployment of appliances in accordance with an embodiment.

FIG. 3 is a block diagram of an example cloud services platform 300 that is configured to support the self-service deployment of appliances in accordance with an embodiment. As shown in FIG. 3, cloud services platform 300 includes a cloud resource manager 302, a plurality of resource providers including a resource provider A 304, a resource provider B 306, a resource provider C 308, and an appliance resource provider 332, and an appliance deployment 310. Each of these components will now be described.

Cloud resource manager 302 is substantially similar to cloud resource manager 102 as described above with respect to FIG. 1, except that appliance support functionality 330 has been added thereto. Consequently, APIs 322, management tools 324, resource group functionality 326, and RBAC functionality 328 may each be configured to operate in a like manner respectively to APIs 122, management tools 124, resource group functionality 126, and RBAC functionality 128, as previously described with respect to FIG. 1, with some modification to these components to support the deployment and management of appliances.

The features of cloud resource manager 302 can be invoked programmatically or by a user to deploy, update, or delete resources that are themselves utilized to support a cloud service deployment, which in this case can include an appliance. In FIG. 3, cloud resource manager 302 has deployed exemplary appliance deployment 310. In one embodiment, cloud resource manager 302 comprises the Microsoft® Azure® Resource Manager, although this is only an example and is not intended to be limiting.

As further shown in FIG. 3, appliance deployment 310 includes a cloud service 312 that is implemented as an appliance resource group (via resource group functionality 326), wherein the appliance resource group comprises a plurality of resources that support cloud service 312. The resources include a resource A 314, a resource B 316, a resource C 318, and an appliance management resource 320. Each of resource A 314, resource B 316, and resource C 318 may comprise resources that are globally available to any customer of cloud services platform 100, wherein such resources may include, for example and without limitation, virtual machines, storage accounts, Web applications, databases, or virtual networks. As was described above with respect to FIG. 1, each of these resources may be made available by a corresponding resource provider, which in this case includes resource provider A 304, resource provider B 306, and resource provider C 308. Resource provider A 304, resource provider B 306 and resource provider C 308 may be termed "static" resource providers in the sense that they are continuously registered with cloud resource manager 302 to provide resource allocation and management services across time and across different customer deployments.

In contrast, appliance management resource 320 comprises a resource that is available only to the customer that deployed the appliance associated therewith, wherein such resource is provided by corresponding appliance resource provider 332. In an embodiment, appliance resource provider 332 is registered with cloud resource manager 302 at the time of appliance deployment and if the deployment is deleted, then appliance resource provider 332 is deleted with it. Thus, appliance resource provider 332 may be termed a "dynamic" resource provider.

The resources provided by appliance resource provider 332 may include vendor-defined management ("control plane") functions that may not be offered by cloud services platform 300 for other types of resources. For example, appliance management resource 320 may comprise a set of appliance-specific APIs that can be used to monitor and/or manage various aspects of appliance deployment 310. This enables the vendor to extend the resource management feature set for appliance deployment 310 to include management features other than those normally provided by cloud resource manager 302. Such appliance-specific APIs may be registered into a same namespace as the other resource management APIs made available by cloud resource manager 302. In this way, the appliance-specific APIs can be accessed using the same management tools 324 already made available by cloud resource manager 302 for the other resource management APIs. This can help provide customers with a seamless and consistent user experience when managing appliance deployment 310 along with their other cloud service deployments within cloud services platform 300.

In an embodiment, cloud resource manager 302 (via appliance support functionality 330) may be configured to treat appliance deployment 310 differently than cloud service deployment 110 as described above with respect to FIG. 1. For example, even though appliance deployment 310 is deployed to a customer's account within cloud services platform 300, cloud resource manager 302 may prohibit the customer from viewing or managing various constituent resources that make up the appliance resource group that defines cloud service 312. For example, by exploiting RBAC functionality 328, cloud resource manager 302 may make only appliance management resource 320 visible to the customer. By limiting the customer's ability to observe and manage an appliance's underlying resources in the foregoing manner, embodiments can prevent customers from tampering with appliance resources once those resources are deployed within the customer account, and can also prevent customers from accessing the intellectual property (e.g., the deployment resource requirements and configuration) that makes up the appliance.

In a further embodiment, cloud resource manager 302 (e.g., via RBAC functionality 328 or some other manner) may grant access to appliance deployment 310 to the vendor that published the appliance. Such access (referred to elsewhere herein as a "projection") may be granted via a vendor account in cloud services platform 300. Such access may advantageously enable the vendor to manage appliance deployment 310 on behalf of the customer. Via this projection feature, vendors may be provided with full access to an appliance's resources for diagnostics and troubleshooting and may self-service update the deployed appliance. Via projections into multiple customer accounts, vendors can query information about provisioned instances of their appliances, including the customers that have deployed them and the version, and can query usage information, customer information, and detect trends to improve their application.

Also, as will be discussed below in more detail with respect to FIG. 4 and FIG. 5, cloud services platform 300 supports a template-based deployment feature that enables an appliance to be self-service published to an online marketplace by a vendor and then self-service deployed therefrom by a customer. As discussed above with respect to FIG. 1, templates are a convenient way to define a cloud service (e.g., an application) that can be customized for individual deployments and that can be used to apply updates. Furthermore, since templates can define resource groups and since resource group access can be controlled via RBAC functionality 328, templates can be used to integrate the cloud services they create with RBAC functionality 328 and policy management of cloud resource manager 302.

Thus, in accordance with an embodiment, templates, resource groups, resource providers and an online marketplace may provide a foundation of a self-service appliance model.

With respect to the foregoing description of cloud services platform 300, it is to be understood that each of cloud resource manager 302, resource provider A 304, resource provider B 306, resource provider C 308, and appliance resource provider 332 may represent software executing on a computer or on one or more interconnected computers. For example, and without limitation, each of these components may be running as software on a collection of networked physical or virtual machines within one or more data centers that comprise cloud services platform 300. Furthermore, with respect to appliance deployment 310, cloud service 312 may comprise software and resource A 314, resource B 316, resource C 318 and appliance management resource 320 may comprise computing resources used to support and/or manage the execution of such software.

Figure 4:
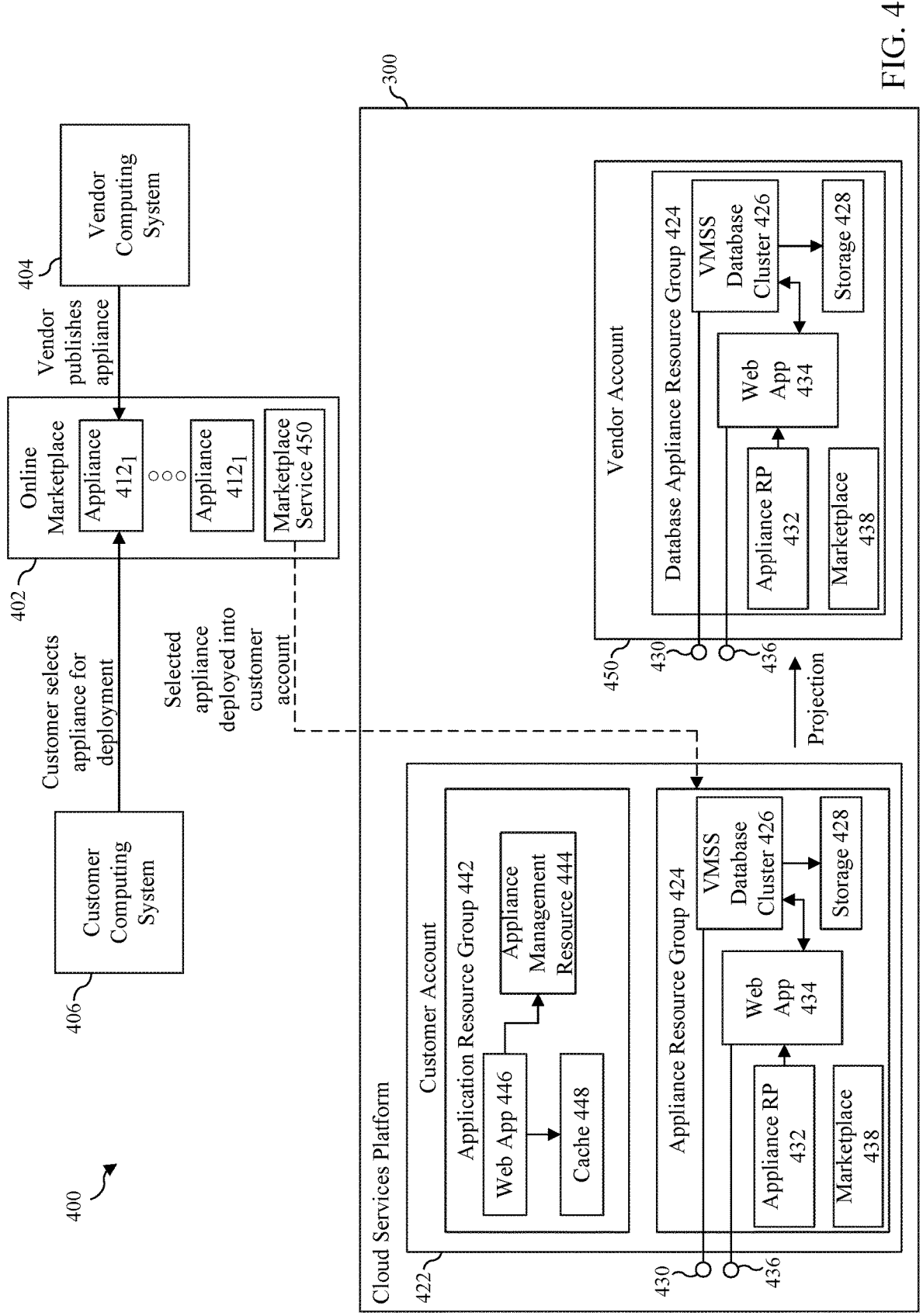
FIG. 4 is a block diagram that illustrates a deployment of a Platform as a Service (PaaS) appliance within the cloud services platform of FIG. 3.

FIG. 4 is a block diagram of a deployment system 400 that illustrates a deployment of a PaaS appliance to cloud services platform 300 in accordance with an embodiment. In this example, the PaaS appliance implements a database cluster.

As shown in FIG. 4, an appliance vendor can utilize its own vendor computing system 404 to publish an appliance 412$_1$ to an online marketplace 402 (e.g., via a first UI thereof), wherein such appliance 412$_1$ includes a template that provides information necessary for a customer to deploy the vendor's appliance to the customer's own account (i.e., to the customer's own set of resources) within cloud services platform 300. Appliance 412$_1$ may be made available along with a variety of other appliances 412$_2$-412$_n$ for consumption by one or more customers. Each appliance made available in online marketplace 402 may published by a variety of different appliance vendors, by a proprietor of cloud services platform 300, or by other entities. Online marketplace 402 may offer hundreds or even thousands of appliances. In one implementation, online marketplace 402 comprises the Microsoft® Azure® Marketplace, a Web site published by Microsoft Corporation of Redmond, Wash., although this is only an example.

A template associated with appliance 212$_1$ includes information necessary to deploy a vendor's appliance within the customer's account. For example, if the vendor's appliance is a PaaS or SaaS application, the template may declare that a certain number of virtual machines, storage accounts, databases, network connections, and/or the like, each having a specified configuration, must first be allocated within the customer's account by customer services platform 300 before deploying the PaaS/SaaS application. The template associated with appliance 412$_1$ may further declare that after such resources have been allocated, that certain specified code comprising the PaaS/SaaS application should be downloaded and installed on one or more of the resources (e.g., one or more virtual machines).

The template associated with appliance 412$_1$ may also declare that certain information, such as resource deployment settings, appliance deployment settings, or the like, should be obtained from the customer during the deployment process. Accordingly, a service that is utilized to manage the deployment process (e.g., a marketplace service 450) may present a UI for obtaining such information from the customer as part of the deployment process.

Other information may be packaged or otherwise included with the template to facilitate the deployment of the appliance. For example, such other information may include UI definition information that can be used to obtain deployment parameters from the customer as part of the deployment process. As will be discussed herein, such other information may also include vendor identification information, billing metadata, or the like.

As shown in the example of FIG. 4, a customer using a customer computing system 406 may browse online marketplace 402 (via a second UI thereof) and select appliance 412$_1$ for deployment to the customer's account within cloud services platform 300, denoted customer account 422. The customer may then initiate the deployment of appliance 412$_1$ via interaction with the aforementioned GUI.

In response to this initiation step, marketplace service 450 (which comprises part of online marketplace 402) will deploy appliance 212$_1$ within customer account 422 in accordance with the template associated with appliance 212$_1$. In FIG. 4, this deployment within customer account 422 is denoted appliance resource group 424. As noted above, the deployment process may be staged in that certain resources may be allocated before other resources, and some or all resources may be allocated before the cloud service provided by the appliance itself is installed. Also, as noted above, this deployment process may involve presenting a UI to the customer (e.g., via customer computing system 406) via which the customer can specify certain deployment settings for the resources to be allocated and for the cloud service itself.

In the example shown in FIG. 4, the template within appliance 412$_1$ deploys a database cluster within customer account 422, where the database cluster functionality is constructed from a virtual machine scale set (VMSS) 426 and a storage account 428. Once deployed, database clients can connect to the database cluster via a database cluster endpoint 430, which may comprise an Internet Protocol (IP) address (although this example is not intended to be limiting). In the example shown in FIG. 4, template 412$_1$ also deploys three appliance-related resources: an appliance resource provider 432 that registers a resource type and its schema with cloud resource manager 302, a Web application 434 that implements a resource provider contract (RPC) associated with appliance resource provider 432 via an appliance resource provider endpoint 436, and a marketplace resource 438 that implements an API for the customer to query appliance billing information, as well as enabling billed appliance functionality and features.

As previously discussed, templates allow for the declarative modelling of complex, multi-resource applications. Each resource declared in a template is of a specific resource type, and resource types are implemented by resource providers. To be a resource provider, a vendor must implement an RPC, which is necessary for cloud resource manager 302 to include the resource types it implements in a control plane and template system of cloud resource manager 302.

Because of the support for command-line tooling, REST APIs, templates, RBAC, tagging, billing, and other functionality that comes from the representation as a resource type in cloud resource manager 302, implementing appliance control planes as resources gives appliances a deep integration with cloud computing platform 300. Today, resource providers are global in nature, however, requiring PaaS and SaaS vendors to create multitenant services to implement them. The appliance model described herein removes the need for a vendor to create a central management service, and enables customer self-service provisioning, by using the concept of an appliance resource provider. Appliance resource providers enable seamless integration of an appliance into the ecosystem of APIs and tooling provided by cloud services platform 300.

One difference between resource providers and appliance resource providers is that resource providers have a global scope and appliance resource providers are more narrowly scoped. For example, in an embodiment, only one resource provider can register for a global resource type (i.e., a resource type available to all customers of cloud services platform 300). By contrast, the scope of an appliance resource provider determines the namespace in which it operates, as well as its visibility. Possible scopes to which an appliance resource provider may be limited include account, tenant, and resource group.

For instance, an appliance resource provider that is scoped to an account defines the resource types it registers for an entire account. If an appliance resource provider registers the resource type CompanyX.DatabaseCluster for an account, that definition overrides any global definition so that resources of that type specified by a call to that account by cloud resource manager 302—whether via REST API or a template—will use the implementation of the type provided by the appliance resource provider.

In an embodiment, an appliance resource provider is the same as a global resource provider in all other ways. The implementation of an appliance resource provider is hidden behind its endpoint and its implementation of the RPC with cloud resource manager 302. In fact, nothing prevents an appliance resource provider from being implemented outside of cloud services platform 300—even on a cloud services platform provided by a different enterprise. While Web application 434 implements the appliance resource provider in the example of FIG. 4, as pointed out, appliance resource providers can be implemented by any compute host accessible to cloud resource manager 302 via, for example, an IP address.

Once appliance resource group 424 is deployed, the customer can create an application resource group 442 in customer account 422 that makes use of appliance resource provider 432. The customer may do so by including an appliance management resource 444 that specifies that it is implemented by appliance resource provider 432 by referencing the name of appliance resource provider 432 in appliance resource group 424. In this way, cloud resource manager 302 determines how to find endpoint 436 of appliance resource provider 432. The output parameters of appliance management resource 444 can include any information that the appliance needs to make available to applications, including database cluster endpoint 430. In the example of FIG. 4, application resource group 442 includes a Web application 446 that has an input parameter that receives database cluster endpoint 430 from appliance management resource 444, as well as an associated cache 448.

To enable a vendor to manage an appliance on behalf of its customers, cloud resource manager 302 projects appliance resource groups into the account of the appliance vendor. Thus as shown in FIG. 4, appliance resource group 424 is projected into a vendor account 450 within cloud services platform 300. The projection results in an appliance-type resource group appearing in the vendor's resource group namespace with RBAC rules that gives the vendor full access to appliance resources. The vendor can use this access to monitor and troubleshoot the operation of the appliance software on behalf of the customer. In an embodiment, to prevent namespace collisions in the vendor's account, projected resource groups have account-unique identifiers, and cloud resource manager 302 implements an API that lets a vendor query the name the customer assigned to the resource group. In a further embodiment, the vendor has no access to any other aspect of the customer's resources, other resource groups, RBAC policy, management policy, or account; they only have access to the appliance's resources.

In an embodiment, a vendor can "seal" an entire appliance, or specific resources in the appliance. A sealed appliance resource group only exposes marketplace resource 438 and appliance resource provider resources, whereas all others are hidden from the customer's view. If a vendor wants to hide only some of the appliance's resources, they can seal just those resources. Sealed resources are visible in the vendor's projection of appliance resource groups. Note that sealing, which makes an appliance a black box from the perspective of a customer, is no different than the experience customers have when they access resources via API endpoints published by a vendor that implements a multitenant service.

PaaS appliances (such as the appliance deployed in FIG. 4) are characterized by the fact that they implement service endpoints for use by applications. Customers include the appliance management resource type so that the application can obtain information about the appliance via the appliance resource provider. For example, the obtained information may be database cluster endpoint 430 that appliance resource provider 432 returns as an output parameter of appliance management resource 444 of application resource group 442. SaaS appliances also implement appliance resource providers so that the customers can interact with the SaaS appliance control plane, but they may also include a resource of the type implemented by the appliance resource provider in the appliance resource group itself.

Figure 5:
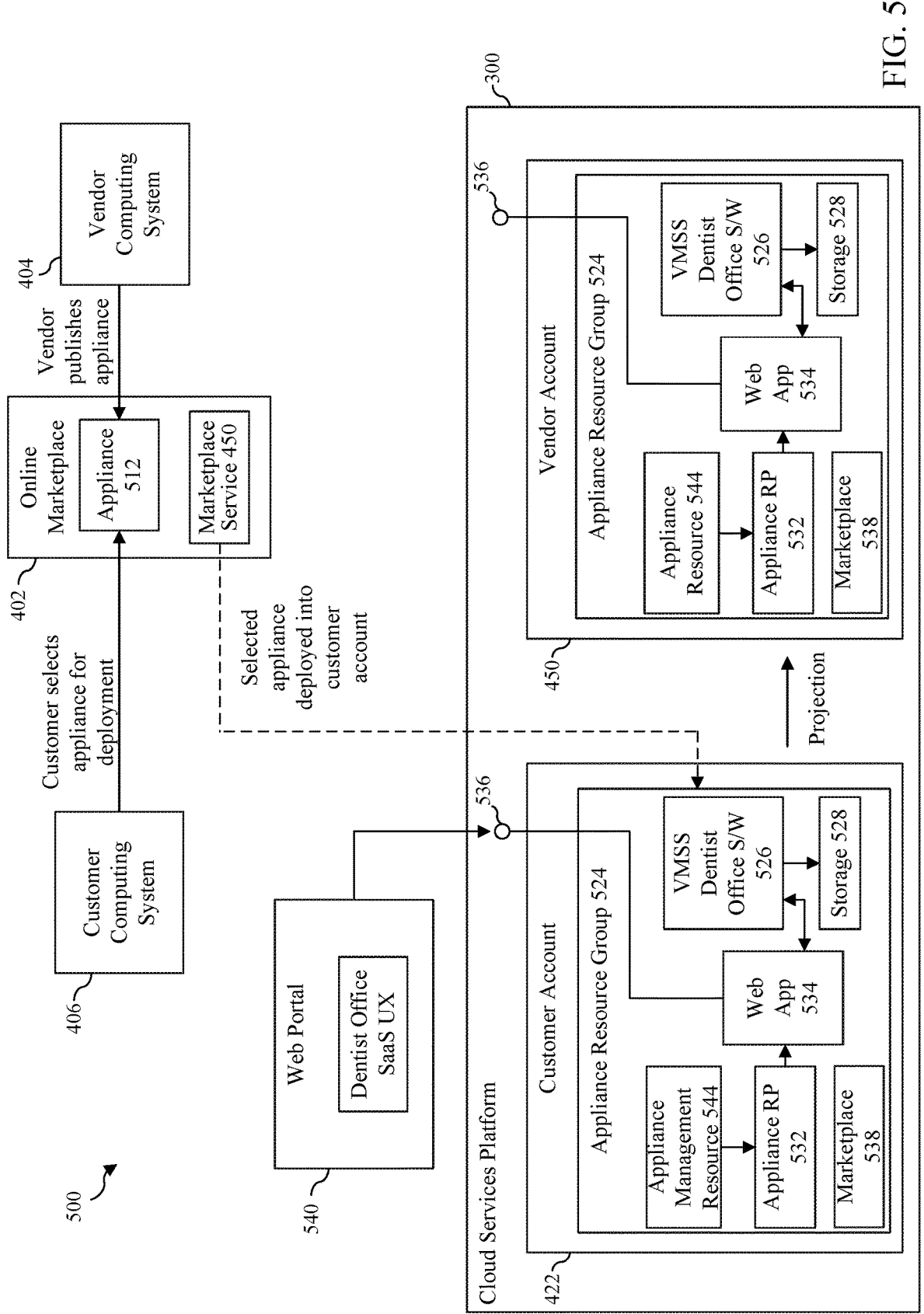
FIG. 5 is a block diagram that illustrates a deployment of a Software as a Service (SaaS) appliance within the cloud services platform of FIG. 3.

This is illustrated by FIG. 5, which is a block diagram of a deployment system 500 that shows the deployment of a SaaS appliance within cloud services platform 300 of FIG. 3. In this example, the SaaS appliance implements dentist office software.

As shown in FIG. 5, an appliance vendor utilizes its own vendor computing system 404 to publish an appliance 512 to online marketplace 402, and a customer using customer computing system 406 selects and initiates deployment of appliance 512 to customer account 422 within cloud services platform 300. Although not shown in FIG. 5 for the sake of simplicity, online marketplace may include any number of appliances for self-service deployment.

In the example shown in FIG. 5, a template associated with appliance 512 deploys dentist office software within customer account 422, where the dentist office software functionality is constructed from a VMSS 526 and a storage account 528. In the example shown in FIG. 5, template 512 also deploys three appliance-related resources: an appliance resource provider 532 that registers a resource type and its schema with cloud resource manager 302, a Web application 534 that implements an RPC associated with appliance resource provider 532 via an appliance resource provider endpoint 536, and a marketplace resource 538 that implements an API for the customer to query appliance billing information, as well as enabling billed appliance functionality and features. To enable the vendor to manage the appliance on behalf of the customer, cloud resource manager 302 projects appliance resource group 424 into vendor account 450 within cloud services platform 300.

Like the PaaS appliance discussed above with respect to FIG. 4, the SaaS appliance of FIG. 5 includes an appliance resource provider 532 that enables customers to interact with its control plane via cloud resource manager 302. However, in the example of FIG. 5, appliance management resource 544 of the type implemented by appliance resource provider 532 is included in application resource group 524 itself. Appliance resource group 524 may be a sealed appliance, such that only appliance management resource 544 and marketplace resource 538 are visible to the customer.

Another aspect of the appliance model shown in FIG. 5 is the extension of the RPC with cloud resource manager 302 to include optional integration with a Web portal 540 of cloud services platform 300. For example, if the appliance includes suitable metadata along with the template, Web portal 540 can provide a basic experience for customers to manage an appliance. However, the RPC can be extended to provide a richer portal experience so that vendors can customize the portal view. Vendors that want full control over the experience, or that want to display an existing portal, can use the RPC to opt out of basic integration so that Web portal 540 embeds the appliance portal within an iframe.

C. Example Appliance Model Details

This Section will provide exemplary and non-limiting implementation details concerning various aspects of appliances and the appliance lifecycle, including mechanisms that may be introduced so that an appliance can expose a management interface that integrates with cloud resource manager 302, how a vendor has access to manage appliances on behalf of its customers, how a vendor specifies appliance billing charges, and how a vendor can keep appliance resources hidden from customers.

1. Appliance Registration

A vendor registers an appliance with online marketplace 402 by submitting an appliance resource group template along with the appliance name to marketplace service 450. The vendor also supplies metadata that may include an appliance icon and description that can be displayed to customers via a GUI of online marketplace 402, as well information that identifies the vendor and billing instructions. In one exemplary and non-limiting embodiment, the vendor may be identified as a Microsoft® Azure® Active Directory® (AAD) principal.

An appliance template may be used to deploy a marketplace resource (e.g., marketplace resource 438 or marketplace resource 538) within the appliance resource group, whose presence may serve two purposes: one is so that marketplace service 450 can be automatically notified when the appliance is deleted, and the second is so that marketplace service 450 can present information directly to the user via the resource about the appliance, including billing information, vendor contact information, and vendor upsell offers such as enhanced support and appliance functionality. Similarly, marketplace service 450 can pass a vendor information about a customer using the same channel.

2. Appliance Provisioning

When a customer provisions an appliance, marketplace service 450 deploys the appliance's template to the customer account and includes the appliance billing metadata, which will be described later. If the appliance deployment is programmatic, the customer specifies the appliance template's parameter values, and if interactive, a Web portal or other UI prompts a user to specify parameter values. This flow leverages all the functionality developed for template deployment with only minor modifications to accommodate appliance templates, which can include the user enabling features advertised via the billing metadata.

Because appliances deploy directly into customer accounts, customers have a range of customization opportunities, starting with the parameters exposed by the template. That customization allows them to place appliance networking endpoints into customer virtual networks. Customers can also install antivirus into appliance virtual machines if the vendor allows, configure Web application firewalls, apply RBAC and management policy to control access to the appliance, and more.

3. Appliance Resource Access

In one embodiment, the customer only has access to the resources in the appliance that the vendor allows, plus the ability to delete the appliance. All other access may be blocked even from account and tenant administrators. To facilitate this, RBAC functionality 328 may be configured to support deny rules, or cloud resource manager 302 may be configured to implement special case logic for appliance resource groups.

In a further embodiment, the vendor is provided with full access to the resources within the appliance resource group, and the vendor can allow the customer to manage only specific resources via RBAC functionality 328. The customer may still retain the ability to delete the appliance resource group, but may be prohibited from deleting even the individual resources within the appliance resource group that a vendor allows them to access.

In accordance with embodiments, cloud resource manager 302 supports a property that marketplace service 450 supplies at the time of resource group creation to specify that the resource group is an appliance. The property includes information about the appliance vendor's account. The presence of the appliance property may cause cloud resource manager 302 to project the appliance resource group into the vendor's account, and prevent the customer from deleting individual resources of the appliance resource group (though not the resource group itself).

As described earlier, vendors can seal an appliance or individual appliance resources. In an embodiment, there are at least two types of seal: a hidden-seal and a read-only seal. The hidden seal causes cloud resource manager 302 to omit all appliance resources except for the marketplace resource from enumeration and access, whereas resources with the read-only seal are visible but cannot be modified by the customer. In an embodiment, all appliance resources are visible in the vendor's projection, and the vendor has full access to the resources. However, the vendor can control access using RBAC functionality 328 in the context of their own account.

In accordance with foregoing embodiments, vendors may know of all deployed instances of their appliances without having to write any special code to achieve this. Vendors may obtain appliance-specific billing information and feature enablement via an appliance's marketplace resource (e.g., marketplace resource 438 or marketplace resource 538) the same way that a customer does.

Embodiments described herein minimize special case behavior specific to appliances, allow customers fine-grained access to appliance visible resources, while enabling an appliance vendor to block access to appliance resources to prevent misconfiguration and to protect intellectual property.

4. Appliance Resource Provider

The appliance model described herein can enable customers to manage appliances using a Web portal, CLI and APIs of cloud resource manager 302, as well as to have the management plane integrate with RBAC functionality 328 thereof. To help enable this, appliances implement an appliance resource provider that defines a resource type that represents the appliance's control plane. The appliance resource provider is not a globally-registered resource provider, but rather one that can be scoped to a specific resource group (or account).

The appliance resource provider defines an appliance management resource type, complete with its own schema. In an embodiment, every appliance template includes an instance of its appliance management resource type, and appliance templates use parameters to configure the resource in the same way as for other resources. The only difference between an appliance resource provider and a global resource provider from the perspective of the template is that an appliance resource provider must specify the resource provider endpoint and schema in the template.

When cloud resource manager 302 deploys an appliance template it will see the presence of the appliance management resource (which marketplace service 450 will ensure is not sealed). If the appliance management resource is implemented from within the appliance resource group that is being created, the appliance management resource specifies the relevant dependencies, as well as a Universal Resource Identifier (URI) that will be available after the appliance resource provider initializes. For example, if the appliance resource provider is hosted in a Web application that is part of the appliance resource group, the appliance management resource will list the Web site as a dependency, and list its URI as the Web application's URI output parameter. Alternatively, if a vendor implements a multitenant resource provider as a central service, the URI will point at the global (or regional, if location is supported) endpoint.

An appliance resource provider can implement appliance management APIs including ones that modify the behavior of the appliance, for example by scaling it or changing its configuration, as well as ones to query the status of the appliance, obtain log files (for example via returned SAS keys of storage objects containing diagnostic output). Appliances desiring integration with a Web portal of cloud resource manager 302 can also implement RPC extensions that the Web portal uses to inject appliance user experience (UX) into the Web portal.

Figure 6:
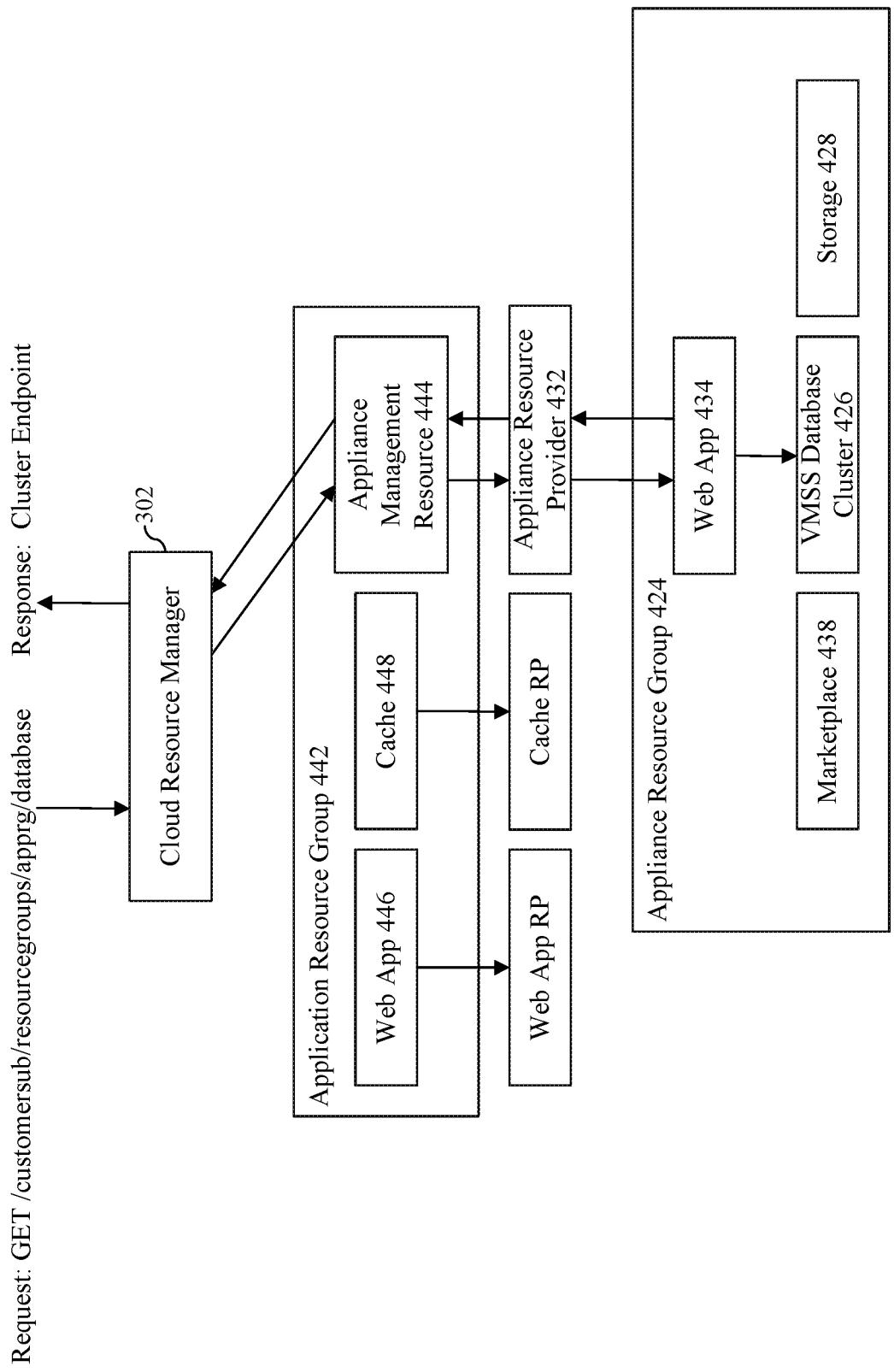
FIG. 6 illustrates a manner in which an appliance resource provider connects resources representing appliances to a cloud resource manager within the cloud services platform of FIG. 3.

To illustrate how appliance resource providers connect resources representing appliances to cloud resource manager 302 and the relationship between an appliance resource provider of a database appliance and resource group, example application resource group 442 shown earlier in FIG. 4 is depicted in FIG. 6. Management tools 324 (e.g., Web portal, CLI) or even other resources in application resource group 442, can obtain the database cluster endpoint URI by querying cloud resource manager 302 to get the output parameter of the database cluster resource. Cloud resource manager 302 routes the request to appliance management resource 434 that is implemented in appliance resource group 424, specifically in Web application 434.

In an embodiment, appliance resource provider core implementations that are configured to handle authentication with cloud resource manager 302, API decoding, and other common resource provider aspects are made available to appliance vendors so that their work to implement an appliance resource provider can be reduced.

5. Appliance Billing and Feature Enablement

Resources that make up an appliance resource group can emit billing meters directly to the customer's account. These charges can show up on a customer bill broken down by charges aggregated for the appliance resource group as well as broken down by the cost of each resource. It may be desirable to obfuscate the internals of an appliance from even billing information. If so, one way that can be accomplished is for cloud resource manager 302 to tag all resources in an appliance resource group with an appliance tag. Billing reports would omit the reporting of resources with the tag, and only show the overall cost of the resource group.

The appliance model can support several different charges for the use of the appliance: one-time provisioning charge; per-minute runtime charge; and appliance-specific charges, such as one applied per appliance user, per appliance operation (e.g. data transaction), and ones for specific feature enablement.

To enable vendors to bill customers for the use of the appliance software via a billing pipeline of cloud services platform 300, marketplace service 450 may pass billing metadata provided by the vendor at the time of appliance registration to its marketplace resource instance hosted in the appliance resource group. This resource emits the one-time provisioning charge, as well as per-minute costs using billing meters associated with cloud services platform 300 to the customer's account.

In an embodiment, the resource provider can emit vendor-supplied text for each additional charge that identifies its source and that the billing system can report in an itemized breakdown of the cost of the appliance. For example, in the first bill after an appliance is provisioned, a customer bill might look like this:

| Database Appliance from CompanyX Inc. | |
|---|---|
| Total cost: | $1,153 |
| VM #1 in appliance | $ 343 |
| VM #2 in appliance | $ 343 |
| VM #3 in appliance | $ 121 |
| Storage for appliance | $ 80 |
| Network Egress for appliance | $ 32 |
| One-time appliance charge | $ 150 |
| Basic functionality @ $0.30/min | $ 360 |
| Feature foo @ $0.15/min | $ 180 |
| Premier support @ $0.10/min | $ 120 |

Enabling vendors to customize appliance billing, and customers to turn on premium features or enlist higher support levels in a self-service manner, are desirable capabilities of an appliance billing system. To accomplish this, billing metadata line items can include a flag that indicates whether the item is active. Because a Web portal associated with cloud service platform 300 can display billing metadata line items for appliances in online marketplace 402, as well as for deployed appliances, it serves as an advertisement of the enhanced capabilities of the appliance. The marketplace resource provider can implement an API that activates line items, triggering the emission of the associated charges. This API support can enable customers to use the Web portal and scripts to configure the appliance's for-cost features.

In some cases, vendors may wish to hide the charges for the appliance's resources. Any charges for sealed resources, which would be all of them for a sealed appliance, can be rolled up as a charge for the appliance itself. Further, a vendor can opt to charge a fixed cost for the appliance and have a raw resource cost come out of that charge (which requires the charge for the appliance to be higher than that accrued by its resources). This effectively hides the cost of the raw resources for when the vendor truly wants to make the appliance opaque. A sealed-appliance bill that hides the resource costs might look like this:

| Database Appliance from CompanyX Inc. | |
| --- | --- |
| Total cost: | $2,120 |
| Appliance cost | $ 2000 |
| Premier support @ $0.10/min | $ 120 |

Appliances can be made aware of customer self-service feature enablement in a timely manner, and optionally, notify the vendor. In an embodiment, this is achieved by configuring appliance resource providers to implement APIs that marketplace service 450 can use to notify it of billing line-item updates. The same design used by resource providers to authenticate cloud resource manager 302 can be used for appliance resource providers authenticating marketplace service 450 (which knows of changes via the marketplace resource in the appliance resource group). In accordance with such a design, cloud resource manager 302 can publish metadata about an endpoint that resource providers query to obtain client-side certificate public keys that they use to validate requests to cloud resource manager 302, and marketplace service 450 publishes a similar API. Appliance resource providers can notify a vendor of changes, if desired, via a vendor-specific mechanism.

6. Appliance Updates

Another part of the appliance lifecycle is receiving updates provided by the vendor. In one embodiment, so that work by a vendor is minimized, marketplace service 450 handles appliance updates. When a vendor has a new version of an appliance, they simply publish it via marketplace service 450. Marketplace service 450 then enumerates the deployed instances of the appliance and submits the revised template to cloud resource manager 302. Marketplace service 450 update functionality may also provide support for gradual rollout protocols, as well as give the vendor explicit control so that they can update specific appliance instances.

Some vendors may also want to give customers some control over when they install updates. This may be important if there will be appliance downtime during the update. It may also be deemed a desirable option for appliances that serve APIs, since there may be risk of application compatibility regression, and customers may wish to validate their applications against test deployments of new versions before updating appliance production deployments. In an embodiment, marketplace service 450 enables this level of control by allowing vendors to specify update deadlines when they submit an update. When there's a future deadline, marketplace service 450 will notify appliance customers of the pending update via the marketplace resource, which will surface update status (e.g., via a Web portal) and be accessible via APIs. A customer then can on-demand apply the update, but if they don't, the update applies automatically when the deadline arrives.

D. Example Appliance-Related Method

Figure 7:
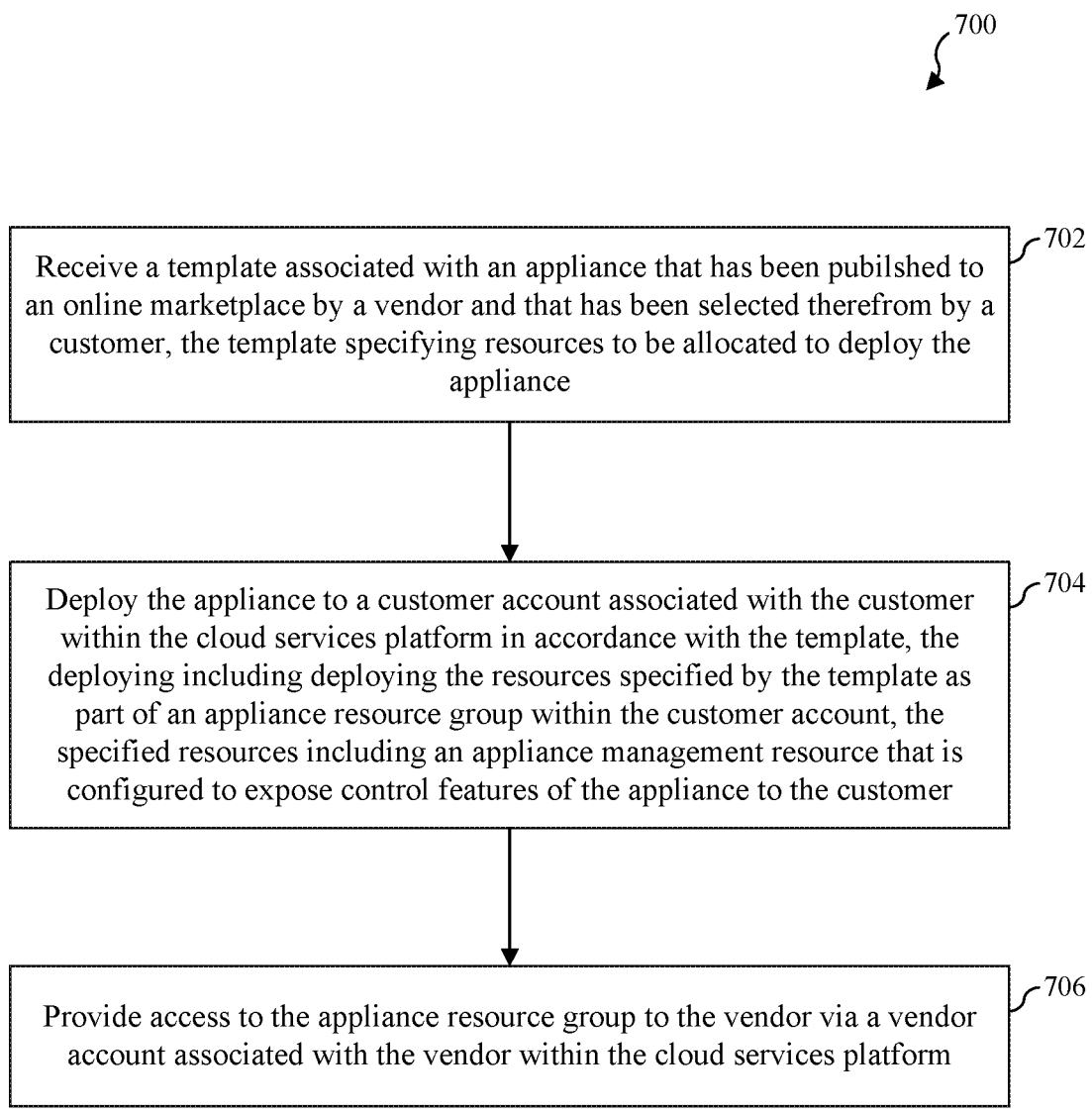
FIG. 7 depicts a flowchart of a method performed by a cloud services platform in accordance with an embodiment.

FIG. 7 depicts a flowchart 700 of a method that may be implemented by a cloud services platform, such as cloud services platform 300 described above with respect to FIG. 3. It will be understood that the present application embodies a variety of other methods than that shown in flowchart 700, which is merely exemplary of some aspects the innovative systems, methods and computer program products described herein. The method of flowchart 300 will now be described with continued reference to embodiments described above with respect to FIGS. 3-5. However, the method is by no means limited to those embodiments.

As shown in FIG. 7, the method of flowchart 700 begins at step 702, in which marketplace service 450 receives a template associated with an appliance that has been published to online marketplace 402 by a vendor and that has been selected therefrom by a customer, the template specifying resources to be allocated to deploy the appliance. In an embodiment, the appliance comprises one of a PaaS application or a SaaS application.

At step 704, marketplace service 450 deploys the appliance to customer account 422 associated with the customer within cloud services platform 300 in accordance with the template, the deploying including deploying the resources specified by the template as part of an appliance resource group (e.g., appliance resource group 424 or appliance resource group 524) within the customer account, the specified resources including an appliance management resource (e.g., appliance management resource 444 or appliance management resource 544) that is configured to expose control features of the appliance to the customer.

At step 706, cloud resource manager 302 provides access to the appliance resource group to the vendor via a vendor account 450 associated with the vendor within cloud services platform 300.

In one embodiment of the method of flowchart 700, the method further includes cloud services platform 300 rendering at least one of the resources in the appliance resource group other than the appliance management resource inaccessible or read-only to the customer.

In another embodiment of the method of flowchart 700, step 706 comprises cloud resource manager 302 rendering all the resources in the appliance resource group accessible to the vendor in the vendor account.

In yet another embodiment of the method of flowchart 700, step 704 of deploying the appliance further comprises registering an appliance resource provider (e.g., appliance resource provider 432 or appliance resource provider 532) with cloud resource manager 302 within cloud services platform 300, the appliance resource provider providing a set of APIs for controlling the appliance via cloud resource manager 302 and the appliance management resource (e.g., appliance management resource 444 or appliance manager resource 544). In further accordance with this embodiment, the set of APIs for controlling the appliance may be registered into a same namespace as other APIs exposed by the cloud resource manager.

In a further embodiment of the method of flowchart 700, the specified resources include a marketplace resource (e.g., marketplace resource 438 or marketplace resource 538) that facilitates providing billing features to the customer relating to the appliance.

III. Example Computer System Implementation

Figure 8:
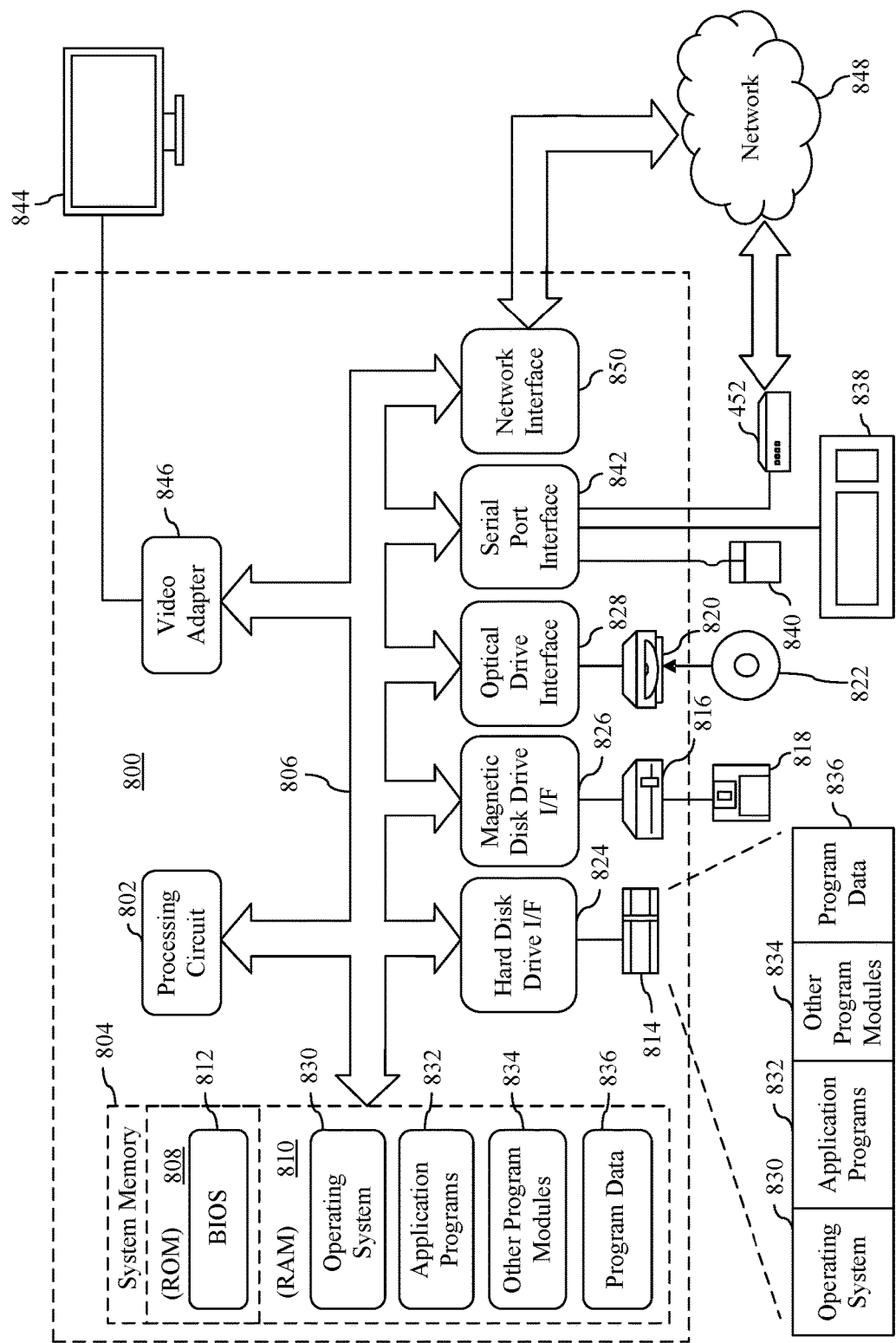
FIG. 8 is a block diagram of an example processor-based computer system that may be used to implement various embodiments.

FIG. 8 depicts an example processor-based computer system 800 that may be used to implement various embodiments described herein, such as any of the embodiments described above with respect to FIGS. 1-7. For example, system 800 may be used to implement or execute any of the elements of cloud services platform 300 as described above with respect to FIGS. 3-5, any of the elements of deployment system 400 as described above with respect to FIG. 4, and any elements of deployment system 500 as described above with respect to FIG. 5. System 800 may also be used to implement or execute the method of flowchart 700 as described above with respect to FIG. 7. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing circuit 802, a system memory 804, and a bus 806 that couples various system components including system memory 804 to processing circuit 802. Processing circuit 802 may comprise one or more microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to implement any of the embodiments described in Section II above and with respect to FIGS. 1-7.

A user may enter commands and information into system 800 through input devices such as a keyboard 838 and a pointing device 840 (e.g., a mouse). Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

Display 844 is connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments discussed herein. Accordingly, such computer programs represent controllers of the system 800.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

III. Additional Exemplary Embodiments

A method implemented by a cloud services platform is described herein. The method includes: receiving a template associated with an appliance that has been published to an online marketplace by a vendor and that has been selected therefrom by a customer, the template specifying resources to be allocated to deploy the appliance; deploying the appliance to a customer account associated with the customer within the cloud services platform in accordance with the template, the deploying including deploying the resources specified by the template as part of an appliance resource group within the customer account, the specified resources including an appliance management resource that is configured to expose control features of the appliance to the customer; and providing access to the appliance resource group to the vendor via a vendor account associated with the vendor within the cloud services platform.

In one embodiment of the foregoing method, the appliance comprises one of a PaaS application or a SaaS application.

In another embodiment of the foregoing method, the method further includes rendering at least one of the resources in the appliance resource group other than the appliance management resource inaccessible or read-only to the customer.

In yet another embodiment of the foregoing method, providing access to the appliance resource group to the vendor comprises rendering all the resources in the appliance resource group accessible to the vendor in the vendor account.

In still another embodiment of the foregoing method, deploying the appliance further comprises registering an appliance resource provider with a cloud resource manager within the cloud services platform, the appliance resource provider providing a set of APIs for controlling the appliance via the cloud resource manager and the appliance management resource. In further accordance with this embodiment, the set of APIs for controlling the appliance may be registered into a same namespace as other APIs exposed by the cloud resource manager.

In a further embodiment of the foregoing method, the specified resources include a marketplace resource that facilitates providing billing features to the customer relating to the appliance.

A system for deploying appliances to a cloud services platform is described herein. The system includes: a computer-implemented online marketplace to which a vendor publishes a template for deploying an appliance associated with the vendor and via which a customer selects the template for deployment; a computer-implemented service that, in response to the selection of the template by the customer, deploys the appliance to a customer account associated with customer within the cloud services platform in accordance with the template, the deploying including deploying resources specified by the template as part of an appliance resource group within the customer account, the specified resources including an appliance management resource that is configured to expose control features of the appliance to the customer; and a cloud resource manager within the cloud services platform that provides access to the appliance resource group to the vendor via a vendor account associated with the vendor within the cloud services platform.

In one embodiment of the foregoing system, the appliance comprises one of a PaaS application or a SaaS application.

In another embodiment of the foregoing system, the cloud resource manager renders at least one of the resources in the appliance resource group other than the appliance management resource inaccessible or read-only to the customer.

In yet another embodiment of the foregoing system, the cloud resource manager renders all the resources in the appliance resource group accessible to the vendor in the vendor account.

In still another embodiment of the foregoing system, the deploying the appliance further comprises registering an appliance resource provider with the cloud resource manager, the appliance resource provider providing a set of APIs for controlling the appliance via the cloud resource manager and the appliance management resource. In further accordance with such an embodiment, the set of APIs for controlling the appliance may be registered into a same namespace as other APIs exposed by the cloud resource manager.

In a further embodiment of the foregoing system, the specified resources include a marketplace resource that facilitates providing billing features to the customer relating to the appliance.

A computer-implemented online marketplace for self-service publication and deployment of appliances for a cloud services platform is described herein. The computer-implemented online marketplace comprises: a first user interface via which a vendor can publish a template for deploying an appliance associated with the vendor; and a second user interface via which a customer can select the template for deployment of the appliance to a customer account associated with the customer within the cloud services platform, the deployment including deploying resources specified by the template as part of an appliance resource group within the customer account, the specified resources including an appliance management resource that is configured to expose control features of the appliance to the customer, and providing access to the appliance resource group to the vendor via a vendor account associated with the vendor within the cloud services platform.

In one embodiment of the foregoing computer-implemented online marketplace, the appliance comprises one of a PaaS application or a SaaS application.

In another embodiment of the foregoing computer-implemented online marketplace, the deployment further includes rending at least one of the resources in the appliance resource group other than the appliance management resource inaccessible or read-only to the customer.

In yet another embodiment of the foregoing computer-implemented online marketplace, providing access to the appliance resource group to the vendor includes rendering all the resources in the appliance resource group accessible to the vendor in the vendor account.

In still another embodiment of the foregoing computer-implemented online marketplace, the deployment further includes registering an appliance resource provider with a cloud resource manager within the cloud services platform, the appliance resource provider providing a set of APIs for controlling the appliance via the cloud resource manager and the appliance management resource.

In a further embodiment of the foregoing computer-implemented online marketplace, the specified resources include a marketplace resource that facilitates providing billing features to the customer relating to the appliance.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method implemented by a cloud services platform, comprising:
receiving a template that has been published to an online marketplace by a vendor and that has been selected therefrom by a customer, the template specifying resources to be allocated to deploy an appliance;
deploying the appliance to a customer account associated with the customer within the cloud services platform in accordance with the template, the deploying including allocating the resources specified by the template as part of an appliance resource group within the customer account, the specified resources including an appliance management resource comprising an application programming interface (API) that is configured to expose control features of the appliance to the customer;

providing access to at least one of the allocated resources in the appliance resource group to the vendor via a vendor account associated with the vendor within the cloud services platform, the appliance resource group within the customer account being rendered visible in a namespace of the vendor account, thereby providing the vendor account full access to the allocated resources in the appliance resource group; and rendering at least one of any of the allocated resources in the appliance resource group read-only to the customer responsive to the at least one of any of the allocated resources being designated, by the vendor via the vendor account, as read-only to the customer, wherein the customer retains an ability to delete, from the customer account, the allocated resources in the appliance resource group, including the allocated resources rendered as read-only to the customer.

2. The method of claim 1, wherein the appliance comprises one of a Platform-as-a-Service (PaaS) application or a Software-as-a-Service (SaaS) application.

3. The method of claim 1, wherein rendering the at least one of the allocated resources in the appliance resource group read-only to the customer comprises: rendering all of the allocated resources in the appliance resource group other than the appliance management resource read-only to the customer.

4. The method of claim 1, wherein providing access to the at least one of the allocated resources in the appliance resource group to the vendor comprises rendering all the allocated resources in the appliance resource group accessible to the vendor in the vendor account.

5. The method of claim 1, wherein deploying the appliance further comprises:
registering an appliance resource provider with a cloud resource manager within the cloud services platform, the appliance resource provider providing access to the API of the appliance management resource via the cloud resource manager.

6. The method of claim 5, wherein the API of the appliance management resource is registered into a same namespace as other APIs exposed by the cloud resource manager.

7. The method of claim 1, wherein the specified resources include a marketplace resource that facilitates providing billing features to the customer relating to the appliance.

8. A system for deploying appliances to a cloud services platform comprising:
one or more processors;
one or more computer-readable media storing computer-executable instructions, that when executed by the one or more processors, cause the one or more processors to implement:
an online marketplace to which a vendor publishes a template and via which a customer selects the template, the template specifying resources to be allocated to deploy an appliance associated with the vendor;
a service that, in response to the selection of the template by the customer, deploys the appliance to a customer account associated with the customer within the cloud services platform in accordance with the template, the deploying including allocating resources specified by the template as part of an appliance resource group within the customer account, the specified resources including an appliance management resource comprising an application programming interface (API) that is configured to expose control features of the appliance to the customer; and a cloud resource manager within the cloud services platform that permits the vendor to access the allocated resources in the appliance resource group via a vendor account associated with the vendor within the cloud services platform, the appliance resource group within the customer account being rendered visible in a namespace of the vendor account, thereby providing the vendor account full access to the allocated resources in the appliance resource group, the cloud resource manager rendering at least one of any of the allocated resources in the appliance resource group read-only to the customer responsive to the at least one of any of the allocated resources being designated, by the vendor via the vendor account, as read-only to the customer, wherein the customer retains an ability to delete, from the customer account, the allocated resources in the appliance resource group, including the allocated resources rendered as read-only to the customer.

9. The system of claim 8, wherein the appliance comprises one of a Platform-as-a-Service (PaaS) application or a Software-as-a-Service (SaaS) application.

10. The system of claim 8, wherein the at least one of the allocated resources in the appliance resource group that is designated as read-only to the customer is an allocated resource other than the appliance management resource.

11. The system of claim 8, wherein the cloud resource manager renders all the allocated resources in the appliance resource group accessible to the vendor in the vendor account.

12. The system of claim 8, wherein the deploying the appliance further comprises:
registering an appliance resource provider with the cloud resource manager, the appliance resource provider providing access to the API of the appliance management resource via the cloud resource manager.

13. The system of claim 12, wherein the API of the appliance management resource is registered into a same namespace as other APIs exposed by the cloud resource manager.

14. The system of claim 8, wherein the specified resources include a marketplace resource that facilitates providing billing features to the customer relating to the appliance.

15. A computer-implemented online marketplace for self-service publication and deployment of appliances for a cloud services platform, comprising:
one or more processors;
one or more computer-readable media storing computer-executable instructions, that when executed by the one or more processors, cause the one or more processors to render:
a first user interface via which a vendor can publish a template, the template specifying resources to be allocated to deploy an appliance associated with the vendor; and
a second user interface via which a customer can select the template to cause deployment of the appliance to a customer account associated with the customer within the cloud services platform, the deployment including:
allocating resources specified by the template as part of an appliance resource group within the customer account, the specified resources including an appliance management resource comprising an application programming interface (API) that is configured to expose control features of the appliance to the customer, providing access to the allocated resources in the appliance resource group to the vendor via a vendor account associated with the vendor within the cloud services platform, the appliance resource group within the customer account being rendered visible in a namespace of the vendor account, thereby providing the vendor account full access to the allocated resources in the appliance resource group, and rendering at least one of any of the allocated resources in the appliance resource group read-only to the customer responsive to the at least one of any of the allocated resources being designated, by the vendor via the vendor account, as read-only to the customer, wherein the customer retains an ability to delete, from the customer account, the allocated resources in the appliance resource group, including the allocated resources rendered as read-only to the customer.

16. The computer-implemented online marketplace of claim 15, wherein the appliance comprises one of a Platform-as-a-Service (PaaS) application or a Software-as-a-Service (SaaS) application.

17. The computer-implemented online marketplace of claim 15, wherein the at least one of the allocated resources in the appliance resource group that is designated as read-only to the customer is an allocated resource other than the appliance management resource.

18. The computer-implemented online marketplace of claim 15, wherein providing access to the appliance resource group to the vendor includes rendering all the allocated resources in the appliance resource group accessible to the vendor in the vendor account.

19. The computer-implemented online marketplace of claim 15, wherein the deployment further includes:

registering an appliance resource provider with a cloud resource manager within the cloud services platform, the appliance resource provider providing access to the API of the appliance management resource via the cloud resource manager.

20. The computer-implemented online marketplace of claim 15, wherein the specified resources include a marketplace resource that facilitates providing billing features to the customer relating to the appliance.

* * * * *